(12) United States Patent
Suzuki et al.

(10) Patent No.: US 11,039,462 B2
(45) Date of Patent: Jun. 15, 2021

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Shoichi Suzuki, Sakai (JP); Wataru Ouchi, Sakai (JP); Tomoki Yoshimura, Sakai (JP); Liqing Liu, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/607,416

(22) PCT Filed: Mar. 29, 2018

(86) PCT No.: PCT/JP2018/013278
§ 371 (c)(1),
(2) Date: Oct. 23, 2019

(87) PCT Pub. No.: WO2018/198662
PCT Pub. Date: Nov. 1, 2018

(65) Prior Publication Data
US 2020/0128574 A1    Apr. 23, 2020

(30) Foreign Application Priority Data
Apr. 25, 2017   (JP) .............................. JP2017-086038

(51) Int. Cl.
*H04W 72/12*   (2009.01)
*H04W 76/28*   (2018.01)
(Continued)

(52) U.S. Cl.
CPC ....... *H04W 72/1268* (2013.01); *H04L 1/1819* (2013.01); *H04L 5/0055* (2013.01);
(Continued)

(58) Field of Classification Search
CPC ............ H04L 1/18; H04L 5/00; H04W 72/04; H04W 72/14; H04W 76/27; H04W 76/28; H04W 80/02
See application file for complete search history.

(56) References Cited

U.S. PATENT DOCUMENTS

2016/0127097 A1* 5/2016 Chen .................... H04L 5/0051
                                                           370/330
2016/0183239 A1  6/2016 Lee et al.
(Continued)

OTHER PUBLICATIONS

Official Communication issued in International Patent Application No. PCT/JP2018/013278, dated Jun. 19, 2018.
LG Electronics et al., "WF on principle of M-PDCCH search space design", 3GPP TSG RAN WG1 #81, R1-153458, May 25-29, 2015, 3 pages.
(Continued)

*Primary Examiner* — Anez C Ebrahim
(74) *Attorney, Agent, or Firm* — Keating & Bennett, LLP

(57) ABSTRACT

A terminal apparatus attempts to decode a PDCCH during an active time in a case that an intermittent reception is configured. The terminal apparatus determines whether to start a UL HARQ RTT timer for a HARQ process based on whether a termination of an uplink transmission is indicated in a case that the PDCCH indicates the uplink transmission for the HARQ process.

5 Claims, 16 Drawing Sheets

(51) Int. Cl.
*H04W 76/27* (2018.01)
*H04L 1/18* (2006.01)
*H04L 5/00* (2006.01)
*H04W 72/04* (2009.01)
*H04W 72/14* (2009.01)
*H04W 80/02* (2009.01)

(52) U.S. Cl.
CPC ......... *H04W 72/042* (2013.01); *H04W 72/14* (2013.01); *H04W 76/27* (2018.02); *H04W 76/28* (2018.02); *H04W 80/02* (2013.01)

(56) References Cited

U.S. PATENT DOCUMENTS

2017/0195088 A1\* 7/2017 Uchino ................. H04L 1/1861
2019/0081743 A1\* 3/2019 Loehr ................... H04L 1/1887

OTHER PUBLICATIONS

Zte et al., "Way Forward on PUCCH enhancement for MTC", 3GPP TSG RAN WG1 Meeting#81, R1-153571, May 25-29, 2015, 3 pages.
LG Electronics Inc., "Support of multiple SPS configurations for non-V2X service", 3 GPP TSG-RAN WG2 Meeting #97 bis, R2-1703918, Apr. 3-7, 2017, 9 pages.
Ericsson, "Uplink HARQ-ACK feedback for MTC", 3GPP TSG-RAN WG1 Meeting #88bis, Ra-1705193, Apr. 3-7, 2017, pp. 1-4.
Ericsson, "Uplink HARQ-ACK feedback for MTC", 3GPP TSG-RAN WG2 ·101, R2-1803082, Feb. 26-Mar. 2, 2018, 4 pages.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.0, Mar. 2017, pp. 1-106.
Zte et al., "Discussion on UL HARQ-ACK feedback enhancement for MTC", 3GPP TSG RAN WG1 Meeting #88 bis, R1-1705484, Apr. 3-7, 2017, 3 pages.

\* cited by examiner

| UL-DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 3

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2017-086038 filed on Apr. 25, 2017, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", "Evolved Universal Terrestrial Radio Access (EUTRA)", or "Evolved Universal Terrestrial Radio Access Network (EUTRAN)") have been studied. In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage multiple cells.

LTE supports a Time Division Duplex (TDD). LTE that employs the TDD scheme is also referred to as TD-LTE or LTE TDD. In TDD, uplink signals and downlink signals are time division multiplexed. Furthermore, LTE supports a Frequency Division Duplex (FDD).

In LTE, Downlink Control Information (DCI) is transmitted using a Physical Downlink Control CHannel (PDCCH) and an Enhanced Physical Downlink Control CHannel (EPDCCH). DCI is used for scheduling of a Physical Downlink Shared CHannel (PDSCH) in a cell.

A technique for transmitting a Machine type communication Physical Downlink Control CHannel (MPDCCH) in multiple subframes has been studied in the 3GPP to improve a downlink cell coverage (NPL 1). In addition, a technique for transmitting a Physical Uplink Control CHannel (PUCCH) in multiple subframes has been studied in the 3GPP to improve an uplink cell coverage (NPL 2).

CITATION LIST

Non Patent Literature

NPL 1: "R1-153458 WF on principle of M-PDCCH search space design", 3GPP TSG RAN WG1 #81, 25-29 May 2015.

NPL 2: "R1-153571 Way Forward on PUCCH enhancement for MTC", 3GPP TSG RAN WG1 #81, 25-29 May 2015.

SUMMARY OF INVENTION

Technical Problem

According to one aspect of the present invention, there is provided a terminal apparatus capable of efficiently communicating with a base station apparatus using multiple physical channels included in multiple subframes, a communication method used by the terminal apparatus, and an integrated circuit mounted on the terminal apparatus.

Solution to Problem (1) According to some aspects of the present invention, the following measures are provided. That is, a first aspect of the present invention is a terminal apparatus including a measurement unit and a transmitter. The measurement unit is configured to calculate one Channel Quality Indicator (CQI). The transmitter is configured to repeatedly transmit uplink control information including at least the one CQI by using each of multiple Physical Uplink Control CHannels (PUCCHs) in multiple subframes. In a case that the uplink control information is transmitted in the PUCCH in an initial subframe included in the multiple subframes, (i) the uplink control information is transmitted by using the PUCCH in a first subframe, or (ii) the uplink control information is not transmitted in the first subframe. The first subframe is included in the multiple subframes and is a subframe different from the initial subframe, based on whether the uplink control information includes a Hybrid Automatic Repeat Request-Acknowledgement (HARQ-ACK).

(2) A second aspect of the present invention is a communication method used for a terminal apparatus including the steps of: calculating one Channel Quality Indicator (CQI); and repeatedly transmitting uplink control information including at least the one CQI by using each of multiple Physical Uplink Control CHannels (PUCCHs) in multiple subframes. In a case that the uplink control information is transmitted in the PUCCH in an initial subframe included in the multiple subframes, (i) the uplink control information is transmitted by using the PUCCH in a first subframe, or (ii) the uplink control information is not transmitted in the first subframe. The first subframe is included in the multiple subframes and is a subframe different from the initial subframe, based on whether the uplink control information includes a Hybrid Automatic Repeat Request-Acknowledgement (HARQ-ACK).

(3) A third aspect of the present invention is an integrated circuit mounted in a terminal apparatus, the integrated circuit including a measurement circuit and a transmission circuit. The measurement circuit is configured to calculate one Channel Quality Indicator (CQI). The transmission circuit is configured to repeatedly transmit uplink control information including at least the one CQI by using each of multiple Physical Uplink Control CHannels (PUCCHs) in multiple subframes. In a case that the uplink control information is transmitted in the PUCCH in an initial subframe included in the multiple subframes, (i) the uplink control information is transmitted by using the PUCCH in a first subframe, or (ii) the uplink control information is not transmitted in the first subframe. The first subframe is included in the multiple subframes and is a subframe different from the initial subframe, based on whether the uplink control information includes a Hybrid Automatic Repeat Request-Acknowledgement (HARQ-ACK).

Advantageous Effects of Invention

According to one aspect of the present invention, a terminal apparatus and a base station apparatus are capable of efficiently communicating using multiple physical channels included in multiple subframes.

BRIEF DESCRIPTION OF DRAWINGS

FIG. 3 is a table illustrating one example of a UL-DL configuration according to the present embodiment.

DESCRIPTION OF EMBODIMENTS

Embodiments of the present invention will be described below.

Figure 1:
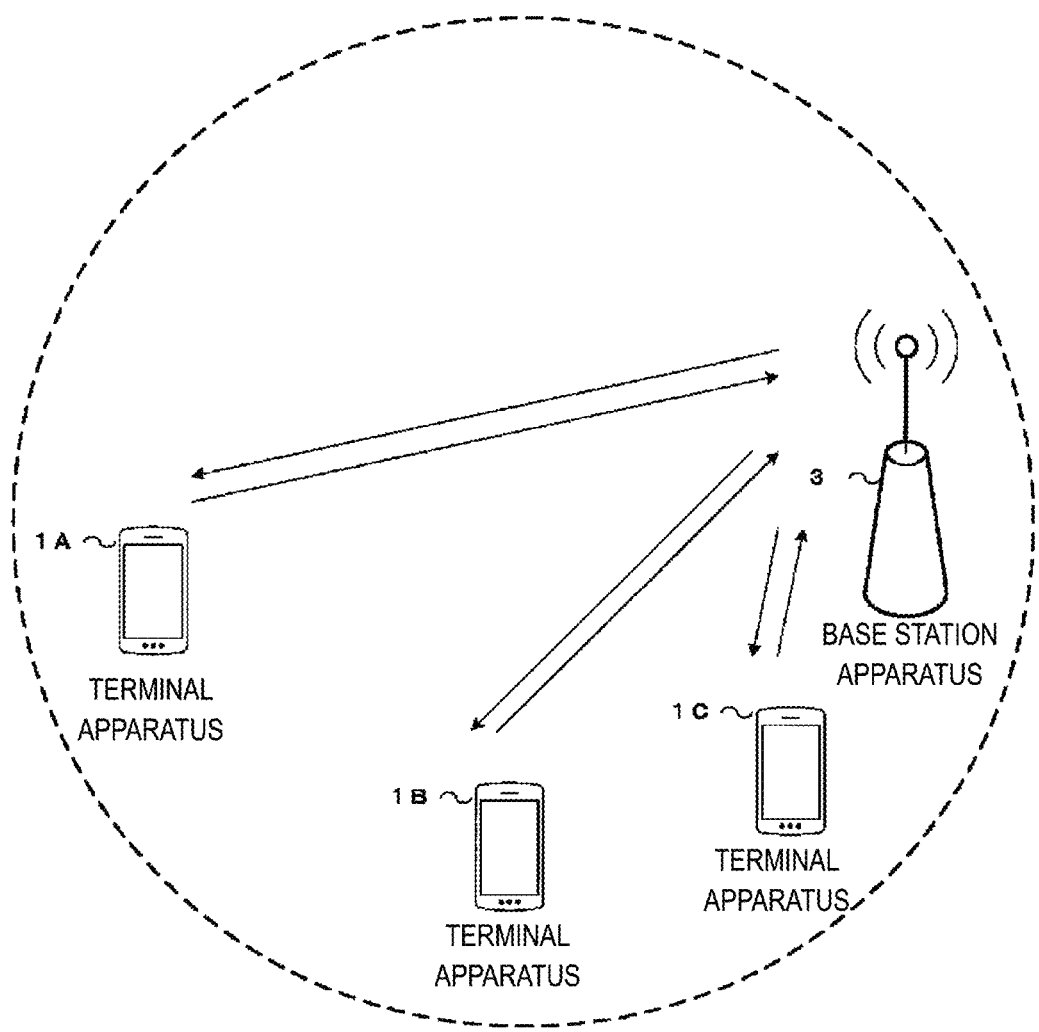
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. The terminal apparatuses 1A to 1C are each referred to as a terminal apparatus 1.

The present embodiment may be applied to an RRC_CONNECTED state, or only to the terminal apparatus 1 in an RRC_CONNECTED mode. The present embodiment may be applied to an RRC_IDLE state or only to the terminal apparatus 1 in the RRC_IDLE state. The present embodiment may be applied to both the RRC_CONNECTED state or the terminal apparatus 1 in the RRC_CONNECTED mode, and the RRC_IDLE state or the terminal apparatus 1 in the RRC_IDLE state.

According to the present embodiment, one serving cell is configured for the terminal apparatus 1. The one serving cell may be a primary cell. The one serving cell may be a cell on which the terminal apparatus 1 is camping. The primary cell is a cell in which an initial connection establishment procedure has been performed, a cell in which a connection re-establishment procedure has been initiated, or a cell indicated as a primary cell in a handover procedure.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier. In FDD, the uplink component carrier and the downlink component carrier correspond to different carrier frequencies. In TDD, the uplink component carrier and the downlink component carrier correspond to the same carrier frequencies.

In the downlink, one independent HARQ entity exists for each serving cell (downlink component carrier). The HARQ entity manages multiple HARQ processes in parallel. The HARQ process indicates the reception of data based on a received downlink assignment (downlink control information) to a physical layer.

In the downlink, at least one transport block is generated for each of one or more Transmission Time Intervals (TTIs) for each serving cell. The transport block and HARQ retransmission of the transport block are mapped to one serving cell. Note that, in LTE, a TTI serves as a subframe. The transport block in the downlink is MAC layer data transmitted on a DownLink Shared CHannel (DL-SCH).

According to the present embodiment, in the uplink, "transport block", "MAC Protocol Data Unit (PDU)", "MAC layer data", "DL-SCH", "DL-SCH data", and "downlink data" are assumed to mean the same thing.

Physical channels and physical signals according to the present embodiment will be described.

One physical channel is mapped to one or more subframes. According to the present embodiment, "one physical channel included in multiple subframes", "one physical channel mapped to multiple subframes", "one physical channel including resources of multiple subframes", and "one physical channel repeatedly transmitted over multiple subframes" are assumed to mean the same thing. The number of repeated transmissions is also referred to as a repetition level.

In uplink radio communication from the terminal apparatus 1 to the base station apparatus 3, the following uplink physical channels are used. The uplink physical channels are used for transmitting information output from a higher layer.

Physical Uplink Control Channel (PUCCH)

Physical Uplink Shared Channel (PUSCH)

Physical Random Access Channel (PRACH)

The PUCCH is used to transmit Uplink Control Information (UCI). The uplink control information includes: downlink Channel State Information (CSI); a Scheduling Request (SR) to be used to request a PUSCH (UpLink-Shared CHannel (UL-SCH)) resource for initial transmission; and/or a Hybrid Automatic Repeat reQuest ACKnowledgement (HARQ-ACK) for downlink data (a Transport block, a Medium Access Control Protocol Data Unit (MAC PDU), a DownLink-Shared CHannel (DL-SCH), or a Physical Downlink Shared CHannel (PDSCH)). The HARQ-ACK indicates an acknowledgement (ACK) or a negative-acknowledgement (NACK). The HARQ-ACK is also referred to as ACK/NACK, HARQ feedback, an HARQ response, HARQ information, or HARQ control information.

The scheduling request includes a positive scheduling request or a negative scheduling request. The positive scheduling request indicates that a UL-SCH resource for initial transmission is requested. The negative scheduling request indicates that the UL-SCH resource for the initial transmission is not requested.

A PUCCH format 1 is used to transmit the positive scheduling request. A PUCCH format 1a is used to transmit 1-bit HARQ-ACK. In a case that the CSI and the HARQ-ACK are not multiplexed, a PUCCH format 2 may be used to report the CSI. The PUCCH format 2 may be used to report the CSI multiplexed with the HARQ-ACK for an extended Cyclic Prefix (CP). A PUCCH format 2a may be used to report the CSI multiplexed with the HARQ-ACK for a normal CP.

The PUSCH is used for transmission of uplink data (Uplink-Shared Channel (UL-SCH)). Furthermore, the PUSCH may be used to transmit the HARQ-ACK and/or channel state information along with the uplink data. Furthermore, the PUSCH may be used to transmit only the channel state information. Furthermore, the PUSCH may be used to transmit only the HARQ-ACK and the channel state information. The repetition level of the PUSCH transmission may be indicated by downlink control information (uplink grant).

Here, the base station apparatus 3 and the terminal apparatus 1 exchange (transmit and/or receive) signals with each other in higher layers. For example, the base station apparatus 3 and the terminal apparatus 1 may transmit and/or receive RRC signaling in a Radio Resource Control (RRC) layer. The base station apparatus 3 and the terminal apparatus 1 may transmit and/or receive, in a Medium Access Control (MAC) layer, a MAC CE. Here, the RRC signaling and/or the MAC CE is also referred to as higher layer signaling. The RRC signaling and/or the MAC CE is included in a transport block.

According to the present embodiment, "RRC signaling", "RRC layer information", "RRC layer signal" "RRC layer parameter", "RRC message", and "RRC information element" are assumed to mean the same thing.

The PUSCH is used to transmit the RRC signaling and the MAC CE. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, user equipment-specific (user equipment-unique) information is transmitted using the signaling dedicated to the certain terminal apparatus 1.

PRACH is used to transmit a random access preamble. The PRACH is used for indicating the initial connection establishment procedure, the handover procedure, the connection re-establishment procedure, synchronization (timing adjustment) for uplink transmission, and the request for the PUSCH (UL-SCH) resource.

The following uplink physical signal is used for uplink radio communication. The uplink physical signal is not used to transmit information output from the higher layer, but is used by a physical layer.

Uplink Reference Signal (UL RS)

The following downlink physical channels are used for downlink radio communication from the base station apparatus 3 to the terminal apparatus 1. The downlink physical channels are used for transmitting information output from the higher layer.

Physical Broadcast Channel (PBCH)
  Physical Control Format Indicator Channel (PCFICH)
  Physical Hybrid automatic repeat request Indicator Channel (PHICH)
  Physical Downlink Control Channel (PDCCH)
  Enhanced Physical Downlink Control Channel (EPDCCH)
  Machine type communication Physical Downlink Control Channel (MPDCCH)
  Physical Downlink Shared Channel (PDSCH)
  Physical Multicast Channel (PMCH)

The PBCH is used for broadcasting a Master Information Block (MIB, a Broadcast Channel (BCH)) that is shared by the terminal apparatuses 1.

The PCFICH is used for transmission of information for indicating a region (OFDM symbols) to be used for transmission of the PDCCH.

The PHICH is used for transmission of an HARQ indicator (HARQ feedback or response information) for indicating an ACKnowledgement (ACK) or a Negative ACKnowledgement (NACK) for the uplink data (UpLink Shared Channel (UL-SCH)) received by the base station apparatus 3.

The PDCCH, the EPDCCH, and the MPDCCH are used for transmitting Downlink Control Information (DCI). According to the present embodiment, the "PDCCH" is assumed to include the "EPDCCH" and the "MPDCCH", for the sake of convenience. The downlink control information is also referred to as DCI format. The downlink control information transmitted on a PDCCH includes a downlink grant and HARQ information, or an uplink grant and HARQ information. The downlink grant is also referred to as a downlink assignment or a downlink allocation. The downlink assignment and the uplink grant are not transmitted together on a PDCCH.

The downlink assignment is used for scheduling a single PDSCH within a single cell. The downlink assignment may be used for scheduling the PDSCH within the same subframe as the subframe in which the downlink grant is transmitted. The downlink assignment may be used for scheduling the PDSCH included in the subframe in which the downlink grant is transmitted and in one or more subsequent subframes.

The uplink grant is used for scheduling of a single PUSCH within a single cell. The uplink grant may be used for scheduling a PUSCH included in one or more subframes subsequent to the subframe in which the uplink grant is transmitted.

Cyclic Redundancy Check (CRC) parity bits added to the downlink control information transmitted on one PDCCH are scrambled with a Cell-Radio Network Temporary Identifier (C-RNTI), a Semi Persistent Scheduling (SPS) C-RNTI, or a Temporary C-RNTI. The C-RNTI and the SPS C-RNTI are identifiers for identifying a terminal apparatus within a cell. The Temporary C-RNTI serves as an identifier for identifying the terminal apparatus 1 that has transmitted a random access preamble in a contention based random access procedure.

The C-RNTI and the Temporary C-RNTI are used to control PDSCH transmission or PUSCH transmission in a single subframe. The SPS C-RNTI is used to periodically allocate a resource for the PDSCH or the PUSCH.

The PDSCH is used to transmit downlink data (Downlink Shared Channel (DL-SCH)).

The PMCH is used to transmit multicast data (Multicast Channel (MCH)).

The following downlink physical signals are used in the downlink radio communication. The downlink physical signals are not used to transmit the information output from the higher layer, but are used by the physical layer.

Synchronization signal (SS)
  Downlink Reference Signal (DL RS)

The synchronization signal is used for the terminal apparatus 1 to establish synchronization in a frequency domain and a time domain in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal apparatus 1 to perform channel compensation on a downlink physical channel. The downlink reference signal is used for the terminal apparatus 1 to obtain the downlink channel state information.

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Chanel State Information-Reference Signal (NZP CSI-RS)
Zero Power Chanel State Information-Reference Signal (ZP CSI-RS)
Multimedia Broadcast and Multicast Service over Single Frequency Network Reference signal (MBSFN RS)
Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in the Medium Access Control (MAC) layer is referred to as a transport channel. The unit of the transport channel used in the MAC layer is also referred to as a Transport Block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

A structure of a radio frame according to the present embodiment will be described.

In LTE, two radio frame structures are supported. The two radio frame structures are Frame structure Type 1 and Frame structure Type 2. Frame structure Type 1 is applicable to FDD. Frame structure Type 2 is applicable to TDD.

Figure 2:
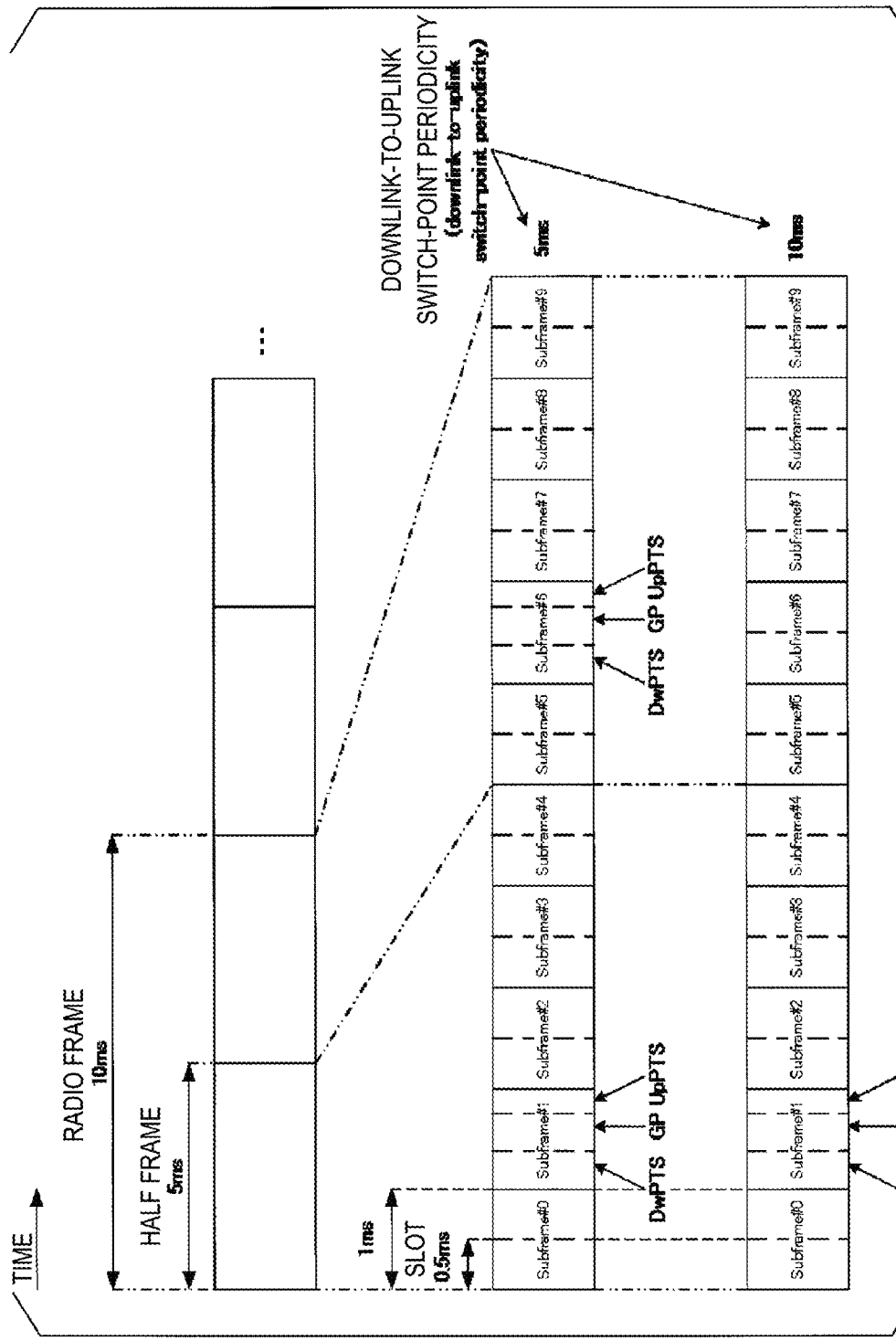
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of radio frames of type 1 and type 2 is 10 ms in length, and is defined by 10 subframes. Each of the subframes is 1 ms in length and is defined by two consecutive slots. Each of the slots is 0.5 ms in length. The i-th subframe within a radio frame includes the (2×i)-th slot and the (2×i+1)-th slot.

Following three types of subframes are defined for Frame structure Type 2.

Downlink subframe
Uplink subframe
Special subframe

The downlink subframe is a subframe reserved for the downlink transmission. The uplink subframe is a subframe reserved for the uplink transmission. The special subframe includes three fields. The three fields are a Downlink Pilot Time Slot (DwPTS), a Guard Period (GP), and an Uplink Pilot Time Slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may include only the DwPTS and the GP, or may include only the GP and the UpPTS.

A radio frame of Frame structure Type 2 includes at least the downlink subframe, the uplink subframe, and the special subframe. The configuration of the radio frame of Frame structure Type 2 is indicated by an uplink-downlink configuration (UL-DL configuration). The terminal apparatus 1 receives information for indicating the UL-DL configuration from the base station apparatus 3. FIG. 3 is a table illustrating one example of the UL-DL configuration according to the present embodiment. In FIG. 3, D denotes a downlink subframe, U denotes an uplink subframe, and S denotes a special subframe.

A configuration of a slot according to the present embodiment will be described below.

Figure 4:
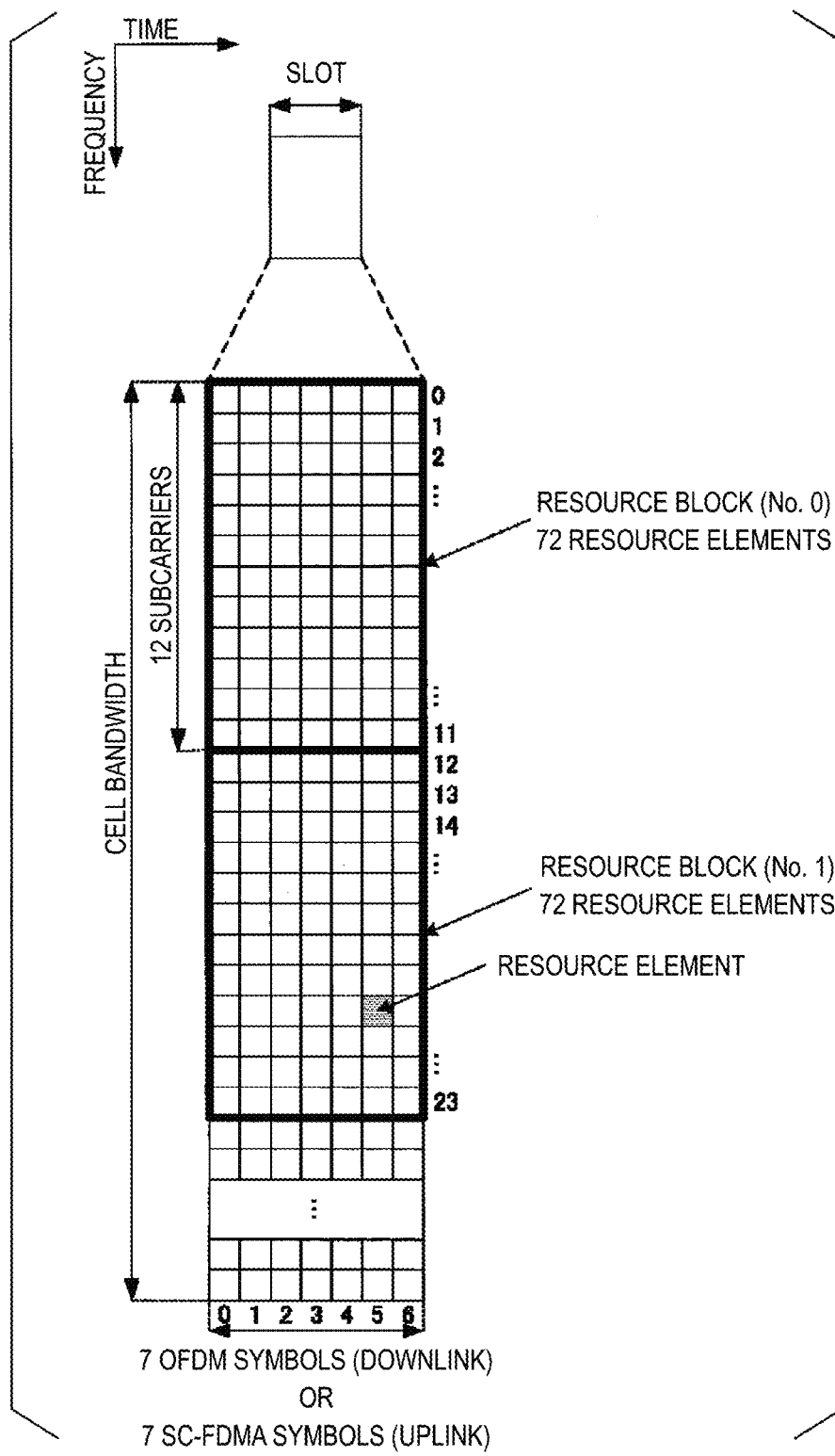
FIG. 4 is a diagram illustrating a configuration of a slot according to the present embodiment.

FIG. 4 is a diagram illustrating a configuration of a slot according to the present embodiment. According to the present embodiment, a normal Cyclic Prefix (CP) is applied to an OFDM symbol. Note that an extended Cyclic Prefix (CP) may be applied to the OFDM symbol. The physical signal or the physical channel transmitted in each of the slots is represented by a resource grid. In FIG. 4, the horizontal axis represents a time axis, and the vertical axis represents a frequency axis. In downlink, the resource grid is defined by multiple subcarriers and multiple OFDM symbols. In uplink, the resource grid is defined by multiple subcarriers and multiple SC-FDMA symbols. The number of subcarriers constituting one slot depends on a cell bandwidth. The number of OFDM symbols or SC-FDMA symbols constituting one slot is seven. Each element within the resource grid is referred to as a resource element. The resource element is identified by a subcarrier number, and an OFDM symbol or an SC-FDMA symbol number.

A resource block is used to represent mapping of a certain physical channel (such as the PDSCH or the PUSCH) to resource elements. As the resource block, a virtual resource block and a physical resource block are defined. A certain physical channel is first mapped to a virtual resource block. Thereafter, the virtual resource block is mapped to a physical resource block. One physical resource block is defined by seven consecutive OFDM symbols or SC-FDMA symbols in the time domain and by 12 consecutive subcarriers in the frequency domain. Hence, one physical resource block includes (7×12) resource elements. Furthermore, one physical resource block corresponds to one slot in the time domain and corresponds to 180 kHz in the frequency domain. Physical resource blocks are numbered from 0 in the frequency domain.

Hereinafter, narrow bands applicable to the present invention will be described.

Figure 5:
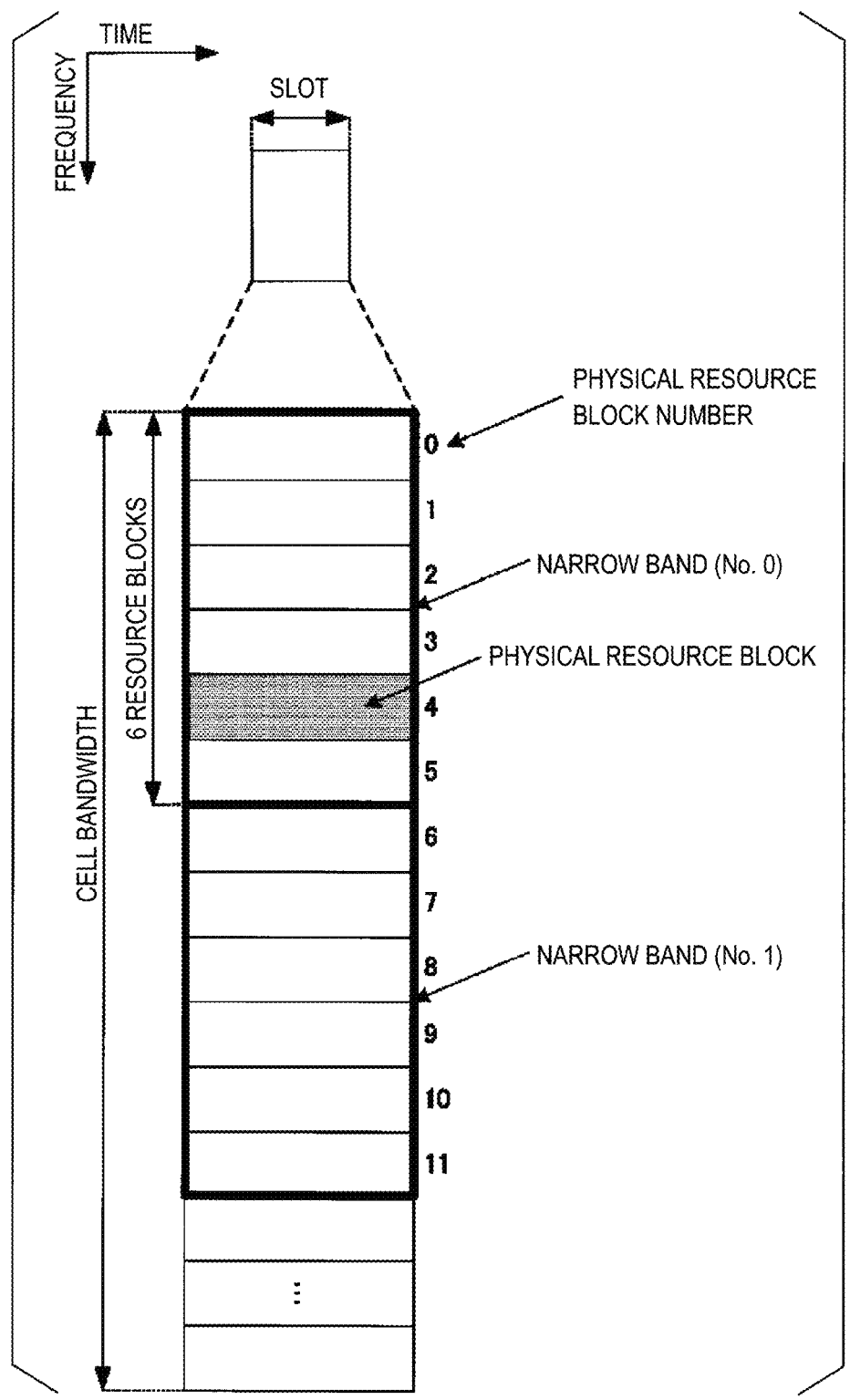
FIG. 5 is a diagram illustrating one example of narrow bands according to the present embodiment.

FIG. 5 is a diagram illustrating one example of narrow bands according to the present embodiment. In FIG. 5, the horizontal axis represents a time axis, and the vertical axis represents a frequency axis. In a slot, a narrow band includes six consecutive physical resource blocks in the frequency domain. The terminal apparatus 1 is not capable of performing simultaneous reception in different narrow bands in a slot. The terminal apparatus 1 may perform reception in a different narrow band for each slot, each subframe, or each subframe set. The terminal apparatus 1 is not capable of performing simultaneous transmission in multiple different narrow bands in a slot. The terminal apparatus 1 may perform transmission on a different narrow band for each slot, each subframe, or each subframe set.

The terminal apparatus 1 needs a gap in the time domain to switch the narrow band in which the terminal apparatus 1 performs reception processing. Moreover, the terminal apparatus 1 also needs a gap in the time domain to switch the narrow band in which the terminal apparatus 1 performs transmission processing. For example, in a case that the terminal apparatus 1 performs reception processing in a first narrow band in a subframe n, the terminal apparatus 1 may perform the reception processing in a different narrow band from the first narrow band in a subframe n+2 without performing the reception processing in any narrow band in a subframe n+1. In other words, in a case that the terminal apparatus 1 performs the reception processing in the first narrow band in the subframe n, the subframe n+1 may be the gap.

Hereinafter, a search space applicable to the present invention will be described. The search space is a set of PDCCH candidates. The PDCCH candidates include resources of one or more subframes.

The terminal apparatus 1 monitors the set of PDCCH candidates in one or more narrow bands configured by higher layer signaling, for downlink control information. Here, monitoring means an attempt to decode each of the PDCCHs in the set of PDCCH candidates in accordance with a format of the downlink control information to be monitored. According to the present embodiment, monitoring of a set of PDCCH candidates is also simply referred to as monitoring of PDCCH.

According to the present embodiment, "PDCCH candidate" and "MPDCCH candidate" are assumed to mean the same thing. According to the present embodiment, "set of PDCCH candidates to be monitored", "set of MPDCCH candidates to be monitored", "search space", "PDCCH search space", "MPDCCH search space", "UE-specific search space", "PDCCH UE-specific search space", and "MPDCCH UE-specific search space" are assumed to mean the same thing.

Figure 6:
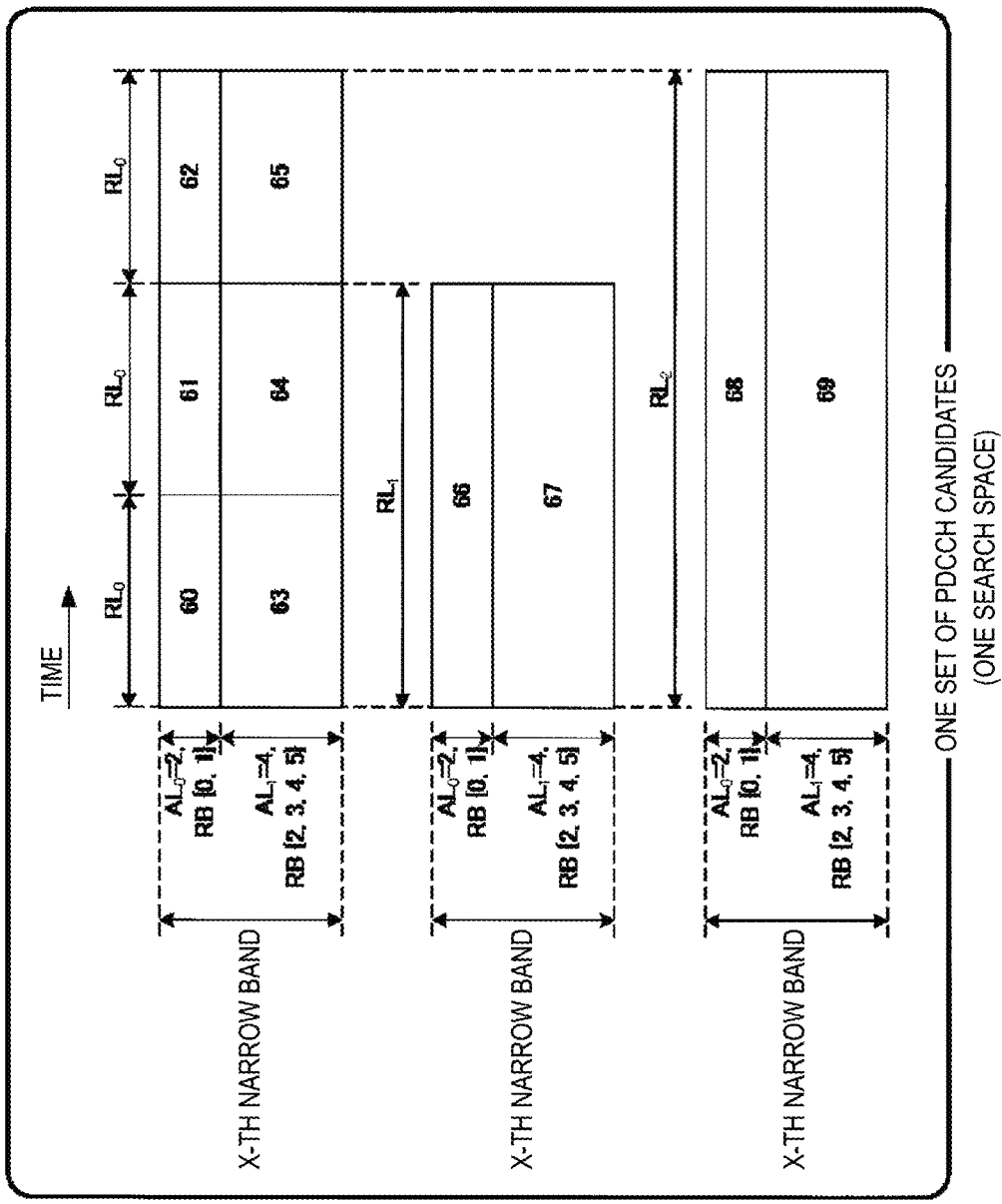
FIG. 6 is a diagram illustrating one example of a search space according to the present embodiment.

FIG. 6 is a diagram illustrating one example of a search space according to the present embodiment.

In FIG. 6, one search space includes PDCCH candidate 60 to PDCCH candidate 69. The PDCCH candidate 60 to the PDCCH candidate 69 are included in an X-th narrow band. In FIG. 6, frequency hopping may be applied to the PDCCH candidates. For example, a narrow band including the PDCCH candidate 60 in a first subframe may be different from another narrow band including the PDCCH candidate 60 in a second subframe. To change the narrow band including the PDCCH candidate, a gap in the time domain (for example, a guard subframe) is needed.

In a slot, the number of resource blocks included in a PDCCH candidate is referred to as an Aggregation Level (AL) of the PDCCH candidate. The aggregation level of the PDCCH candidates 60, 61, 62, 66, and 68 is 2 ($AL_0=2$). The aggregation level of the PDCCH candidates 63, 64, 65, 67, and 69 is 4 ($AL_1=4$).

The number of subframes including one PDCCH candidate is referred to as a Repetition Level (RL) of the PDCCH candidate. The repetition level of the PDCCH candidates 60, 61, 62, 63, 64, and 65 is represented by $RL_0$. The repetition level of the PDCCH candidates 66 and 67 is represented by $RL_1$. The repetition level of the PDCCH candidates 68 and 69 is represented by $RL_2$.

Multiple PDCCH candidates included in the same search space may overlap each other. For example, in FIG. 6, the PDCCH candidate 68 overlaps the PDCCH candidates 60, 61, 62, and 66. The multiple subframes including the respective PDCCH candidates 60, 61, 62, and 66 are parts of the multiple subframes including the PDCCH candidate 68. In the frequency domain, two indices of the two resource blocks included in the PDCCH candidates 60, 61, 62, 66, and 68 are identical.

The position (subframes and resource blocks) of the search space in the time domain and/or in the frequency domain may be configured by a higher layer. The position (subframes and resource blocks) of the search space in the time domain and/or in the frequency domain may be configured by the terminal apparatus 1, based on a higher layer message (an RRC message) received from the base station apparatus 3.

The physical channel may not be included in a subframe satisfying a given condition. According to the present embodiment, "multiple subframes including a physical channel" and "the number of subframes including a physical channel" may be defined in consideration of the subframe(s) satisfying the given condition, or may be defined without consideration of the subframe(s) satisfying the given condition.

The PDCCH candidates may not be included in a subframe satisfying the given condition. The repetition level of the PDCCH candidate may be defined without consideration of the subframe(s) satisfying the given condition. For example, in a case where a certain PDCCH candidate is included in subframe 1 to subframe 10 and two subframes included in the subframe 1 to the subframe 10 satisfy a given condition, the repetition level of the certain PDCCH candidate may be 10.

The repetition level of a PDCCH candidate may be defined in consideration of the subframe(s) satisfying the given condition. For example, in a case that a certain PDCCH candidate is included in the subframe 1 to the subframe 10 and two subframes included in the subframe 1 to the subframe 10 satisfy a given condition, the repetition level of the certain PDCCH candidate may be 8.

For example, the above-described given condition may include some or all of condition (a) to condition (d) below.

Condition (a): the subframe is reserved as an MBSFN subframe

Condition (b): in TDD, the subframe is an uplink subframe

Condition (c): the subframe is a gap (a guard subframe) for frequency hopping applied to the PDCCH candidate Condition (d): the subframe is a part of a configured measurement gap Note that the conditions included in the above-described given conditions are not limited to the condition (a) to the condition (d), and a condition different from the condition (a) to the condition (d) may be used, or some of the condition (a) to the condition (d) may be used.

According to the present embodiment, "from the X-th subframe" means "from the X-th subframe inclusive". According to the present embodiment, "to the Y-th subframe" means "to the X-th subframe inclusive".

Now, Discontinuous Reception (DRX) applicable to the present invention will be described.

A DRX functionality is configured by a higher layer (RRC) and processed through MAC. The DRX functionality controls a PDCCH monitoring activity of the terminal apparatus 1 for the C-RNTI and the SPS C-RNTI of the terminal apparatus 1.

In other words, the DRX functionality controls the monitoring activity of the terminal apparatus 1 for the PDCCH to be used to transmit a DCI format, to which CRC parity bits scrambled with the C-RNTI or SPS C-RNTI of the terminal apparatus 1 are added.

With the configured DRX, the terminal apparatus 1 may discontinuously monitor the PDCCHs through a DRX operation described below. In other cases, the terminal apparatus 1 may continuously monitor the PDCCHs.

The higher layer (RRC) controls the DRX operation by configuring the following multiple timers and a drxStartOffset value. Whether to configure a drxShortCycleTimer and a shortDRX-Cycle is optional for the higher layer (RRC).

onDurationTimer
drx-InactivityTimer
drx-RetransmissionTimer (one for each downlink HARQ process except for a downlink HARQ process corresponding to a broadcast process)
drx-ULRetransmissionTimer (one for each uplink HARQ process)
longDRX-Cycle
HARQ Round Trip Time (RTT) timer (one for each downlink HARQ process)
UL HARQ RTT (Round Trip Time) timer (one for each uplink HARQ process)
drxShortCycleTimer (optional)
shortDRX-Cycle (optional)

According to the present embodiment, the downlink HARQ process and the uplink HARQ process are asynchronous HARQ processes. In other words, according to the present embodiment, the downlink and uplink HARQ operations are asynchronous.

The base station apparatus 3 may transmit, to the terminal apparatus 1, an RRC message including parameters/information for indicating the values of onDurationTimer, drx-InactivityTimer, drx-RetransmissionTimer, drx-ULRetransmissionTimer, longDRX-Cycle, drxShortCycleTimer, shortDRX-Cycle, and drxStartOffset.

The terminal apparatus 1 may set the values of onDurationTimer, drx-InactivityTimer, drx-RetransmissionTimer, drx-ULRetransmissionTimer, longDRX-Cycle, drxShortCycleTimer, shortDRX-Cycle, and drxStartOffset, based on the received RRC message.

The longDRX-Cycle and the shortDRX-Cycle are also collectively referred to as a DRX cycle.

The onDurationTimer indicates the number of consecutive PDCCH subframes from the start of the DRX cycle.

The drx-InactivityTimer indicates the number of consecutive PDCCH subframes subsequent to the subframe, to which the PDCCH indicating initial transmission of uplink data or downlink data to the terminal apparatus 1 is mapped.

The drx-RetransmissionTimer indicates the maximum number of consecutive PDCCH subframes for downlink retransmission expected by the terminal apparatus 1. The same value of the drx-RetransmissionTimer is applied to all serving cells.

The drx-ULRetransmissionTimer indicates the maximum number of consecutive PDCCH subframes until the uplink grant for uplink retransmission is received. The same value of the drx-ULRetransmissionTimer is applied to all serving cells.

The DRX cycle indicates a cycle for repeating On Duration. A period of the On Duration is followed by a period in which a PDCCH monitoring inactivity of the terminal apparatus 1 for the C-RNTI and SPS C-RNTI of the terminal apparatus 1 is enabled.

Figure 7:
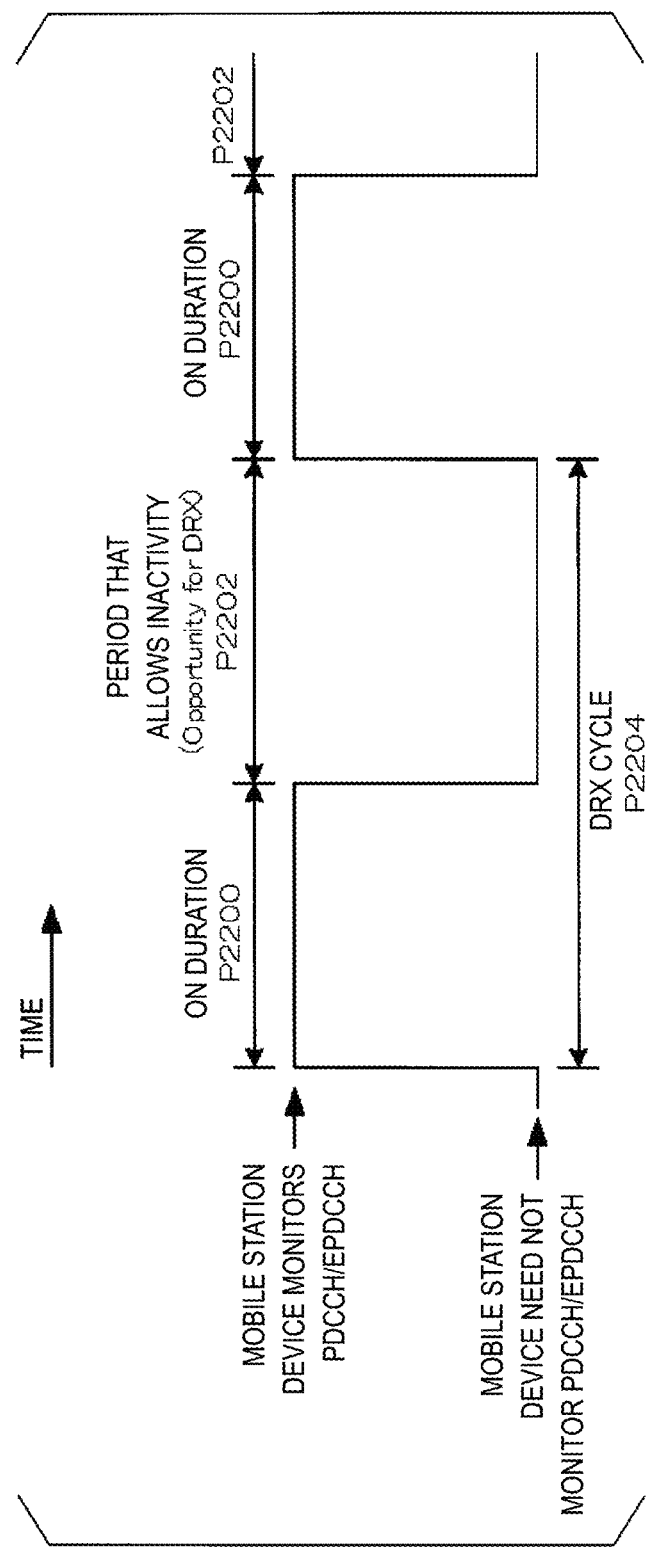
FIG. 7 is a diagram illustrating one example of a DRX cycle according to the present embodiment.

FIG. 7 is a diagram illustrating one example of the DRX cycle according to the present embodiment. In FIG. 7, the horizontal axis represents a time axis. In FIG. 7, the terminal apparatus 1 monitors PDCCHs in an On Duration period P2200. In FIG. 7, a period P2202 subsequent to the On Duration period P2200 is a period that allows an inactivity. In other words, in FIG. 7, the terminal apparatus 1 may not monitor the PDCCHs in the period P2202.

The drxShortCycleTimer indicates the number of consecutive subframes in which the terminal apparatus 1 follows a shortDRX-Cycle.

The drxStartOffset indicates a subframe in which the DRX cycle starts.

An HARQ RTT timer corresponding to a downlink HARQ process relates to the start of the drx-RetransmissionTimer and is managed for each downlink HARQ process. The HARQ RTT timer corresponding to the downlink HARQ process indicates the minimum interval from transmission of downlink data to retransmission of the downlink data. In other words, the HARQ RTT timer corresponding to the downlink HARQ process indicates the minimum number of subframes before the terminal apparatus 1 expects the downlink HARQ retransmission.

Note that, according to the present embodiment, one downlink HARQ process controls the HARQ of one piece of downlink data (a transport block). Alternatively, one downlink HARQ process may control two pieces of downlink data.

An UL HARQ RTT timer corresponding to the uplink HARQ process relates to the start of the drx-ULRetransmissionTimer and is managed for each uplink HARQ process. The UL HARQ RTT timer corresponding to the uplink HARQ process indicates the minimum interval from transmission of uplink data to retransmission of the uplink data. In other words, the UL HARQ RTT timer corresponding to the uplink HARQ process indicates an amount of subframes before the terminal apparatus 1 expects the uplink grant for the uplink retransmission.

For example, in a case that the DRX cycle is configured, an Active Time may include a period satisfying at least one of condition (e) to condition (l) described below.

Condition (e): onDurationTimer, drx-InactivityTimer, drx-RetransmissionTimer, or mac-ContentionResolutionTimer is running Condition (f): a scheduling request is transmitted on a PUCCH and is pending Condition (g): there is a possibility that an uplink grant for pending HARQ retransmission is transmitted for synchronous HARQ, and the corresponding HARQ buffer holds data Condition (h): after successful reception of a random access response for a preamble that is not selected by the terminal apparatus 1, a PDCCH, which is accompanied with the C-RNTI of the terminal apparatus 1 and which indicates initial transmission has not been received Condition (i): the terminal apparatus 1 is monitoring PDCCH candidates included in multiple subframes Condition (j): a subframe (monitoring subframe) for monitoring a termination command is configured in a period where the PUSCH is transmitted in a case that the terminal apparatus 1 is configured to receive the termination command.

Condition (k): the terminal apparatus 1 is configured to receive the termination command and transmits the PUSCH.

Condition (l): a transmission gap in a case that the terminal apparatus 1 is configured to receive the termination command Note that the conditions used to determine whether a certain period is included in the Active Time are not limited to the condition (e) to the condition (l), and a condition different from the condition (e) to the condition (l) may be used, or some of the condition (e) to the condition (l) may be used.

Once a timer starts, the timer keeps running until the timer is stopped or the timer expires. In other cases, the timer is not running. In a case that the timer is not running, the timer may be started. In a case that the timer is running, the timer may be restarted. The timer is always to be started or restarted from an initial value of the timer.

The preamble serves as a message 1 in a random access procedure, and is transmitted on a PRACH. The preamble that is not selected by the terminal apparatus 1 relates to a contention-based random access procedure.

The random access response serves as a message 2 in the random access procedure, and is transmitted on a PDSCH. The base station apparatus 3 transmits the random access response to the received preamble.

The terminal apparatus 1 performing the contention-based random access procedure receives the random access response, and then transmits a message 3. After transmitting the message 3, the terminal apparatus 1 monitors a PDCCH relating to a message 4.

The mac-ContentionResolutionTimer indicates the number of consecutive subframes in which the terminal apparatus 1 monitors the PDCCH after the message 3 is transmitted.

The base station apparatus 3 may transmit, to the terminal apparatus 1, an RRC message including a parameter/information for indicating the reception of the termination command to the terminal apparatus 1. The terminal apparatus 1 may configure the parameter/information for indicating the reception of the termination command to the terminal apparatus 1 based on the RRC message.

The base station apparatus 3 may transmit the RRC message including a parameter/information for indicating the monitoring subframe in the condition (j) to the terminal apparatus 1. The terminal apparatus 1 may configure the parameter/information for indicating the monitoring subframe in the condition (j) based on the RRC message.

The termination command is used to indicate the termination of the PUSCH transmission (repeated PUSCH transmission). The terminal apparatus 1 may terminate the repeated PUSCH transmission based on the reception/detection of the termination command.

The termination command may include at least some or all of the following.
  ACK
  Downlink control information (uplink grant and/or downlink assignment)
  Downlink control information including multiple information fields set to specific values (uplink grant and/or downlink assignment)

The multiple fields set to the specific values may include at least some or all of a field of information on TPC command for scheduled PUSCH, a field of information on cyclic shift for DMRS (Cyclic shift DMRS), and a field of information on Modulation and Coding Scheme (MCS) and redundancy version.

The field of the information on the TPC command for the PUSCH (TPC command for scheduled PUSCH) set to the specific value may be a field of the information on the TPC command for the PUSCH (TPC command for scheduled PUSCH) set to '11'. The field of the information on the cyclic shift for the DMRS (Cyclic shift DMRS) set to the specific value may be a field of the information on the cyclic shift for the DMRS (Cyclic shift DMRS) set to '111'.

The termination command may include the downlink grant for the terminal apparatus 1 in a half duplex FDD operation. The termination command need not include the downlink grant for the terminal apparatus 1 in a full duplex FDD operation. The termination command may include the downlink grant for the terminal apparatus 1 in a TDD operation. The termination command need not include the downlink grant for the terminal apparatus 1 in the TDD operation.

The termination command may be included in the PDCCH. The CRC parity bits scrambled with the C-RNTI or the SPS C-RNTI may be added to the termination command.

Figure 8:
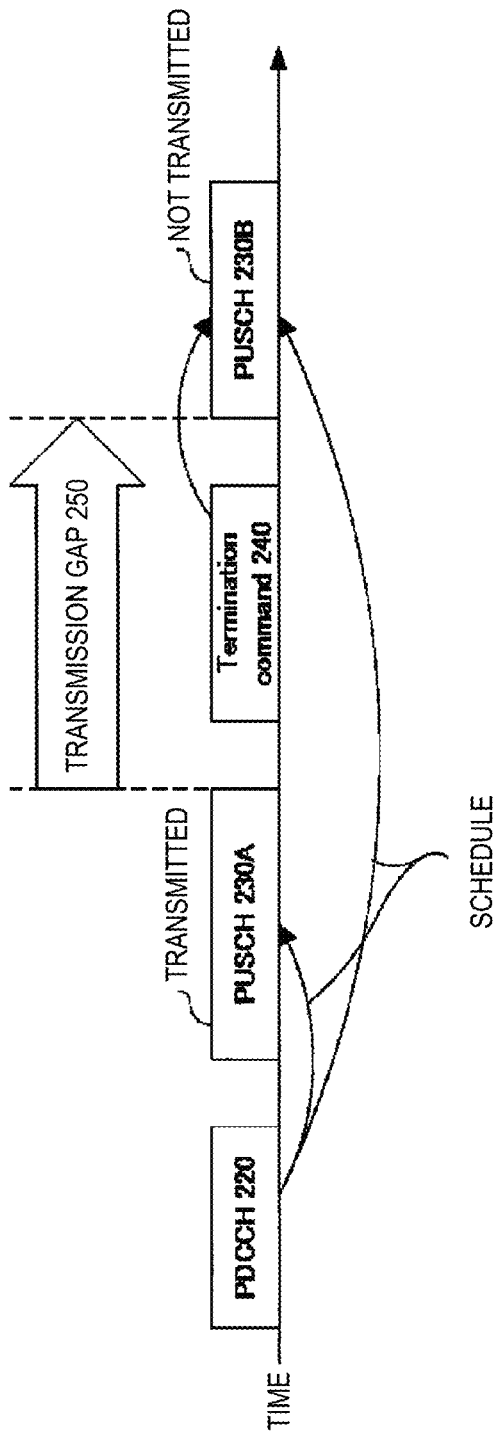
FIG. 8 is a diagram illustrating one example of operations regarding a termination command according to the present embodiment.

FIG. 8 is a diagram illustrating one example of operations regarding the termination command according to the present embodiment. In FIG. 8, a PDCCH 220 includes an uplink grant for scheduling a PUSCH 230. The PUSCH transmission 230 is discontinuous in the time domain. The PUSCH transmission 230 includes a PUSCH transmission 230A and a PUSCH transmission 230B. The terminal apparatus 1 may drop the PUSCH transmission 230B based on the reception of a termination command 240. In a case that the number of repetitions of the PUSCH transmission 230 does not exceed a predetermined value, a transmission gap 240 need not be applied. In a case that the number of repetitions of the PUSCH transmission 230 exceeds the predetermined value, the transmission gap 240 may be applied. The base station apparatus 3 may transmit an RRC message including a parameter/information for indicating the predetermined value to the terminal apparatus 1.

In FIG. 8, the terminal apparatus 1 does not transmit the PUSCH 230 in a transmission gap 250. The base station apparatus 3 may transmit an RRC message including a parameter/information regarding a transmission gap to the terminal apparatus 1. The parameter/information regarding the transmission gap may indicate at least one or both of the length of the transmission gap and the subframe in which the transmission gap is started. The Active Time may include the transmission gap 250. The terminal apparatus 1 may monitor the termination command 240 in the transmission gap 250. The terminal apparatus 1 may monitor the termination command 240 in the monitoring subframe in the transmission gap 250.

Figure 9:
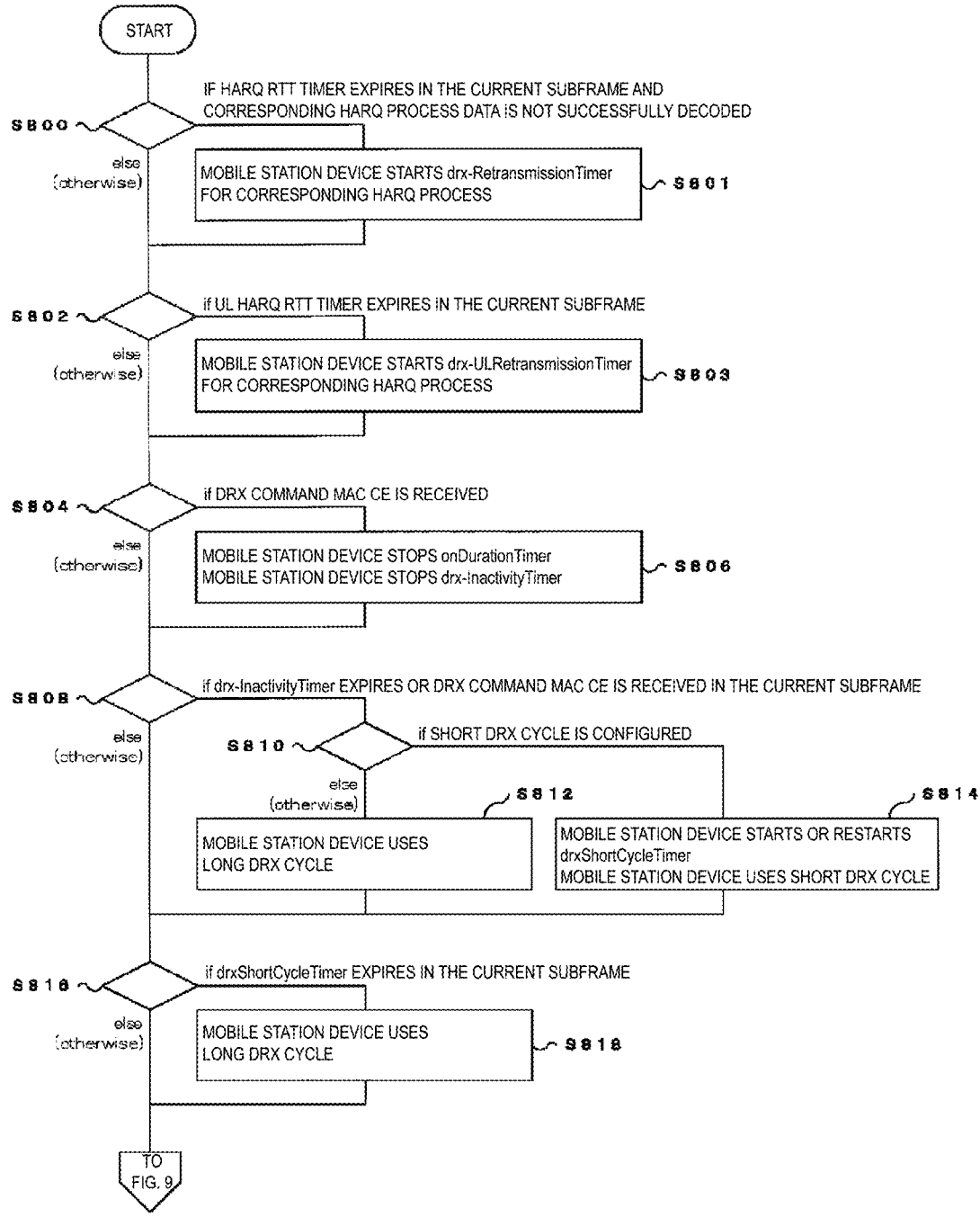
FIG. 9 is a flowchart illustrating one example of a DRX operation according to the present embodiment.
Figure 10:
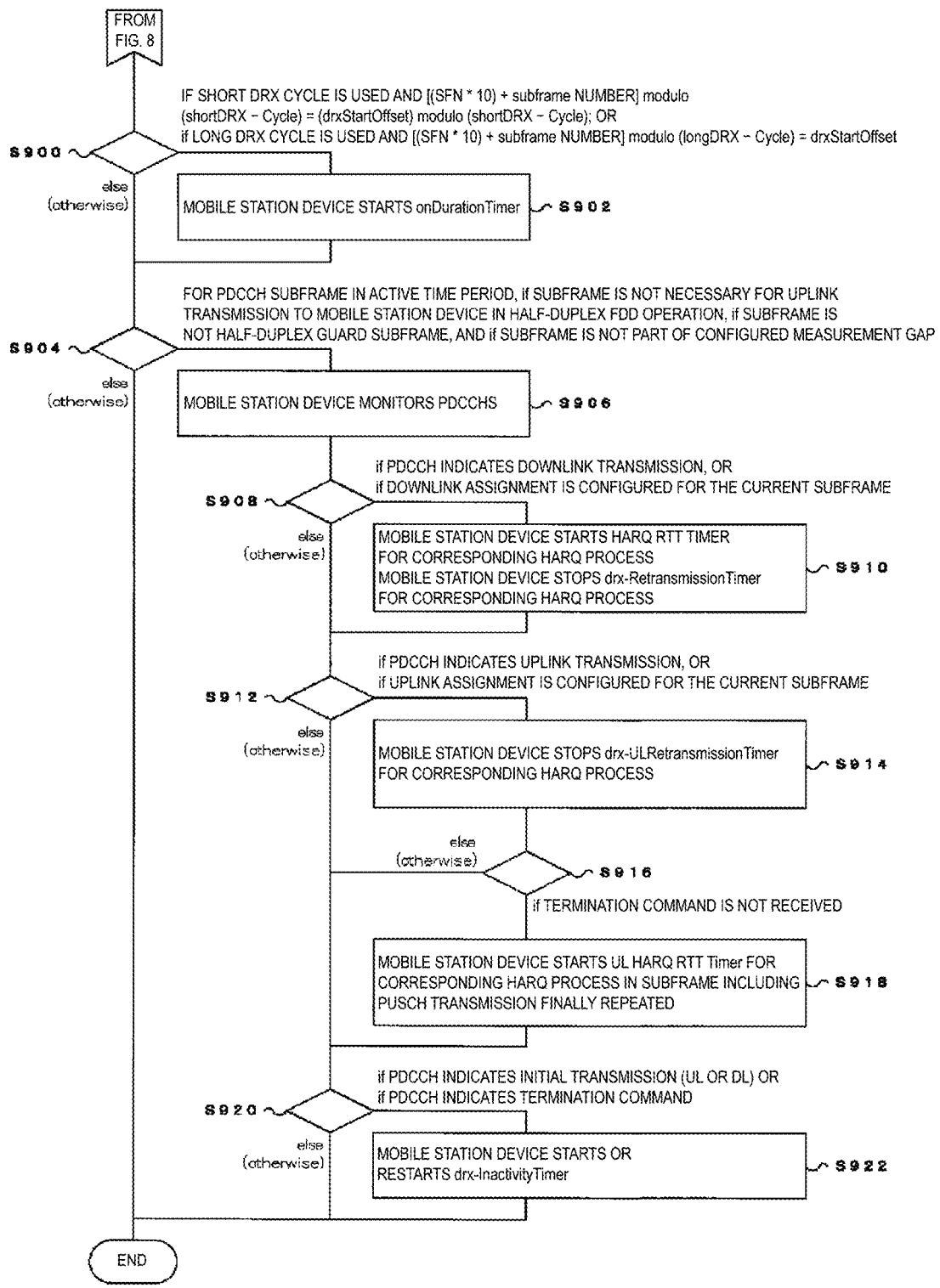
FIG. 10 is a flowchart illustrating one example of the DRX operation according to the present embodiment.

FIG. 9 and FIG. 10 are flowcharts, each illustrating one example of the DRX operation according to the present embodiment. In a case that the DRX is configured, the terminal apparatus 1 performs the DRX operation on each of the subframes based on the flowcharts in FIG. 9 and FIG. 10.

In a case that the HARQ RTT timer corresponding to the downlink HARQ process expires in the current subframe and the data of the HARQ process corresponding to the HARQ RTT timer is not decoded successfully (S800), the terminal apparatus 1 starts the drx-RetransmissionTimer for the downlink HARQ process corresponding to the HARQ RTT timer (S801) and processing proceeds to S802. Otherwise (S800), the processing of the terminal apparatus 1 proceeds to S802.

In a case that the UL HARQ RTT timer corresponding to the uplink HARQ process in the current subframe expires (S802), the terminal apparatus 1 starts the drx-ULRetransmissionTimer for the uplink HARQ process corresponding to the UL HARQ RTT timer (S803) and processing proceeds to S804. Otherwise (S802), the processing of the terminal apparatus 1 proceeds to S804.

In a case that a DRX command MAC CE is received (S804), the terminal apparatus 1 stops the onDurationTimer and the drx-InactivityTimer (S806), and processing proceeds to S808. Otherwise (S804), processing of the terminal apparatus 1 proceeds to S808.

In a case that the drx-InactivityTimer expires or the DRX command MAC CE is received in the current subframe (S808), processing of the terminal apparatus 1 proceeds to S810. Otherwise (S808), processing of the terminal apparatus 1 proceeds to S816.

In a case that a shortDRX-Cycle is not configured (S810), the terminal apparatus 1 uses a longDRX-Cycle (S812), and processing proceeds to S816. In a case that the shortDRX-Cycle is configured (S810), the terminal apparatus 1 starts or restarts the drxShortCycleTimer to use the shortDRX-Cycle (S814) and processing proceeds to S816.

In a case that the drxShortCycleTimer expires in the current subframe (S816), the terminal apparatus 1 uses the longDRX-Cycle (S818) and processing proceeds to S900 in FIG. 9. Otherwise (S816), processing of the terminal apparatus 1 proceeds to S900 in FIG. 9.

In a case that (1) the shortDRX-Cycle is used and [(SFN*10)+subframe number] modulo (shortDRX-Cycle)= (drxStartOffset) modulo (shortDRX-Cycle), or that (2) the longDRX-Cycle is used and [(SFN*10)+subframe number] modulo (longDRX-Cycle)=drxStartOffset (S900), the terminal apparatus 1 starts the onDurationTimer (S902) and processing proceeds to S904. Otherwise (S900), processing of the terminal apparatus 1 proceeds to S904.

In a case that all the conditions (m) to (q) below are satisfied (S904), the terminal apparatus 1 monitors the PDCCH in the current subframe (906) and processing proceeds to S908.

Condition (m): the current subframe is included in an Active Time period
Condition (n): the current subframe is a PDCCH subframe
Condition (o): the current subframe is not necessary for uplink transmission to the terminal apparatus 1 with a half-duplex FDD operation
Condition (p): the subframe is not a half-duplex guard subframe
Condition (q): the current subframe is not a part of a configured measurement gap For one FDD serving cell, all subframes are PDCCH subframes. The terminal apparatus 1 and the base station apparatus 3 identify a PDCCH subframe for a TDD serving cell, based on the UL-DL configuration. The terminal apparatus 1 for communicating with the base station apparatus 3 through one TDD serving cell, and the base station apparatus 3 identify (select or determine), as a PDCCH subframe, the subframe indicated as a downlink subframe or a subframe including DwPTS in the UL-DL configuration corresponding to the serving cell.

The half-duplex FDD operation includes a type A half-duplex FDD operation and a type B half-duplex FDD operation. The terminal apparatus 1 may transmit information for indicating whether to support the type A half-duplex FDD in the FDD band, to the base station apparatus 3. The terminal apparatus 1 may transmit information for indicating whether to support the type B half-duplex FDD in the FDD band, to the base station apparatus 3.

In the type A half-duplex FDD operation, the terminal apparatus 1 is not capable of performing uplink transmission and downlink reception simultaneously.

In the type B half-duplex FDD operation, a subframe immediately before the subframe in which the terminal apparatus 1 performs uplink transmission and a subframe immediately after the subframe in which the mobile station device 1 performs uplink transmission are each a half-duplex guard subframe.

In the type B half-duplex FDD operation, the terminal apparatus 1 is not capable of performing uplink transmission and downlink reception simultaneously. In the type B half-duplex FDD operation, the terminal apparatus 1 is not capable of performing downlink reception in a subframe immediately before the subframe in which the terminal apparatus 1 performs uplink transmission. In the type B half-duplex FDD operation, the terminal apparatus 1 is not capable of performing downlink reception in a subframe immediately after the subframe in which the terminal apparatus 1 performs uplink transmission.

The measurement gap is a time interval for the terminal apparatus 1 to perform measurements of cells operating at different frequencies and/or measurements regarding different Radio Access Technologies (RATs). The base station apparatus 3 transmits information for indicating the period of the measurement gap to the terminal apparatus 1. The terminal apparatus 1 configures the period of the measurement gap, based on the information.

In a case that at least one of the conditions (m) to (q) is not satisfied (S904), the terminal apparatus 1 terminates the DRX operation in the current subframe. In other words, in a case that at least one of the conditions (m) to (q) is not satisfied, the terminal apparatus 1 need not monitor the PDCCH in the current subframe.

Note that the conditions used in S904 are not limited to the condition (m) to the condition (q). In S904, a condition different from the condition (m) to the condition (q) may be used, or some of the condition (m) to the condition (q) may be used.

In a case that the downlink assignment received via the PDCCH indicates downlink transmission or in a case that a downlink assignment is configured for the current subframe (S908), the terminal apparatus 1 starts the HARQ RTT timer for the corresponding downlink HARQ process and stops the drx-RetransmissionTimer for the corresponding downlink HARQ process (S910), and processing proceeds to S912. Otherwise (S908), processing of the terminal apparatus 1 proceeds to S912.

The state in which the downlink assignment is configured denotes a state in which semi persistent scheduling is activated by the downlink assignment along with an SPS C-RNTI.

In a case that the uplink grant received via the PDCCH indicates uplink transmission or in a case that the uplink grant is configured for the current subframe (S912), the terminal apparatus 1 stops the drx-ULRetransmissionTimer for the corresponding uplink HARQ process (S914), and processing proceeds to S916. Otherwise (S912), the terminal apparatus 1 proceeds to S920.

The state with the uplink grant configured means a state in which semi persistent scheduling is activated by the uplink grant along with the SPS C-RNTI.

In a case that the termination command is not received (S916), the terminal apparatus 1 starts the UL HARQ RTT timer for the corresponding uplink HARQ process in the subframe including the corresponding PUSCH transmission (uplink transmission) (S918) finally repeated, and processing proceeds to S920. Otherwise (S916), the processing of the terminal apparatus 1 proceeds to S920.

"No reception of the termination command" may be "an indication of the termination of the uplink transmission" or "an indication of the termination of the PUSCH transmission by the PDCCH". In a case that the termination command is received, the physical layer of the terminal apparatus 1 may deliver a termination command reception indicator to the MAC layer. That is, "no reception of the termination command" may be "no reception of the termination command reception indicator from the physical layer".

In a case that the downlink assignment or the uplink grant received via the PDCCH indicates an initial transmission in the downlink or in the uplink (S920), the terminal apparatus 1 starts or restarts the drx-InactivityTimer (S922) and terminates the DRX operation in the current subframe. Otherwise (S920), the terminal apparatus 1 terminates the DRX operation in the current subframe.

FIG. 11 to FIG. 14 are diagrams, each illustrating one example of operations regarding the UL HARQ RTT timer according to the present embodiment. In FIG. 11 to FIG. 14, P100 indicates a period in which the onDurationTimer is running, P110 indicates a period in which the drx-InactivityTimer is running, P115 indicates the monitoring subframe, P120 indicates a period in which the UL HARQ RTT timer is running, and P130 indicates a period in which the drx-ULRetransmissionTimer is running. The terminal apparatus 1 detects the PDCCH 220. The PDCCH 220 includes an uplink grant for scheduling an initial transmission of the PUSCH 230 (230A, 230B). Based on the indication of the PUSCH initial transmission 230 by the PDCCH 220, the terminal apparatus 1 starts a drx-InactivityTimer P110 in a subframe next to the last subframe including the PDCCH 220. The terminal apparatus 1 monitors the termination command 240 in the monitoring subframe P115.

Figure 11:
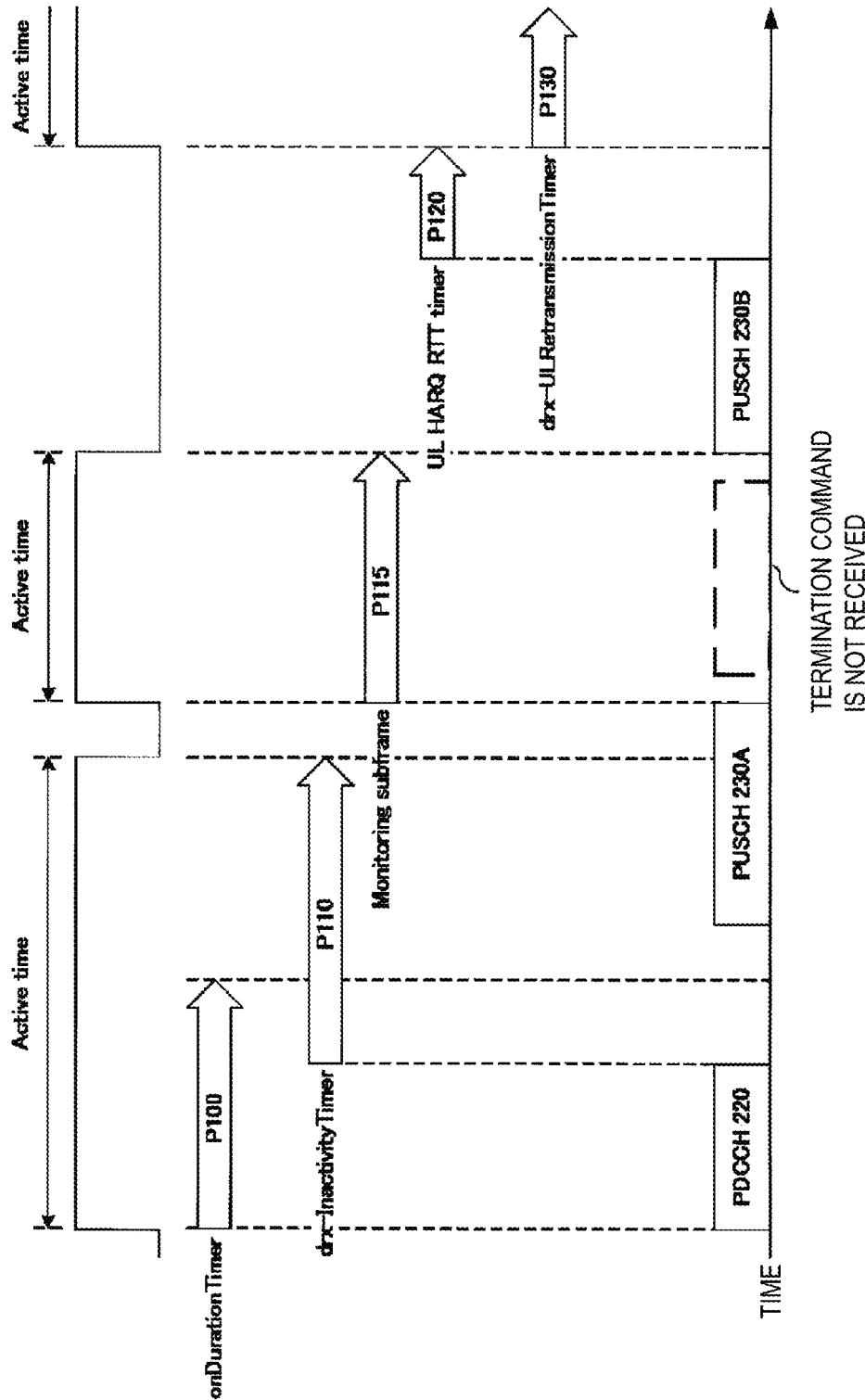
FIG. 11 is a diagram illustrating one example of operations regarding a UL HARQ RTT timer according to the present embodiment.

In FIG. 11, the terminal apparatus 1 does not detect the termination command 240. In FIG. 11, the terminal apparatus 1 starts the UL HARQ RTT timer based on (i) the uplink grant received via the PDCCH indicates the uplink transmission and (ii) the termination command is not received. Here, the UL HARQ RTT timer is started in a subframe next to the last subframe including the PUSCH transmission 230 finally repeated.

Figure 12:
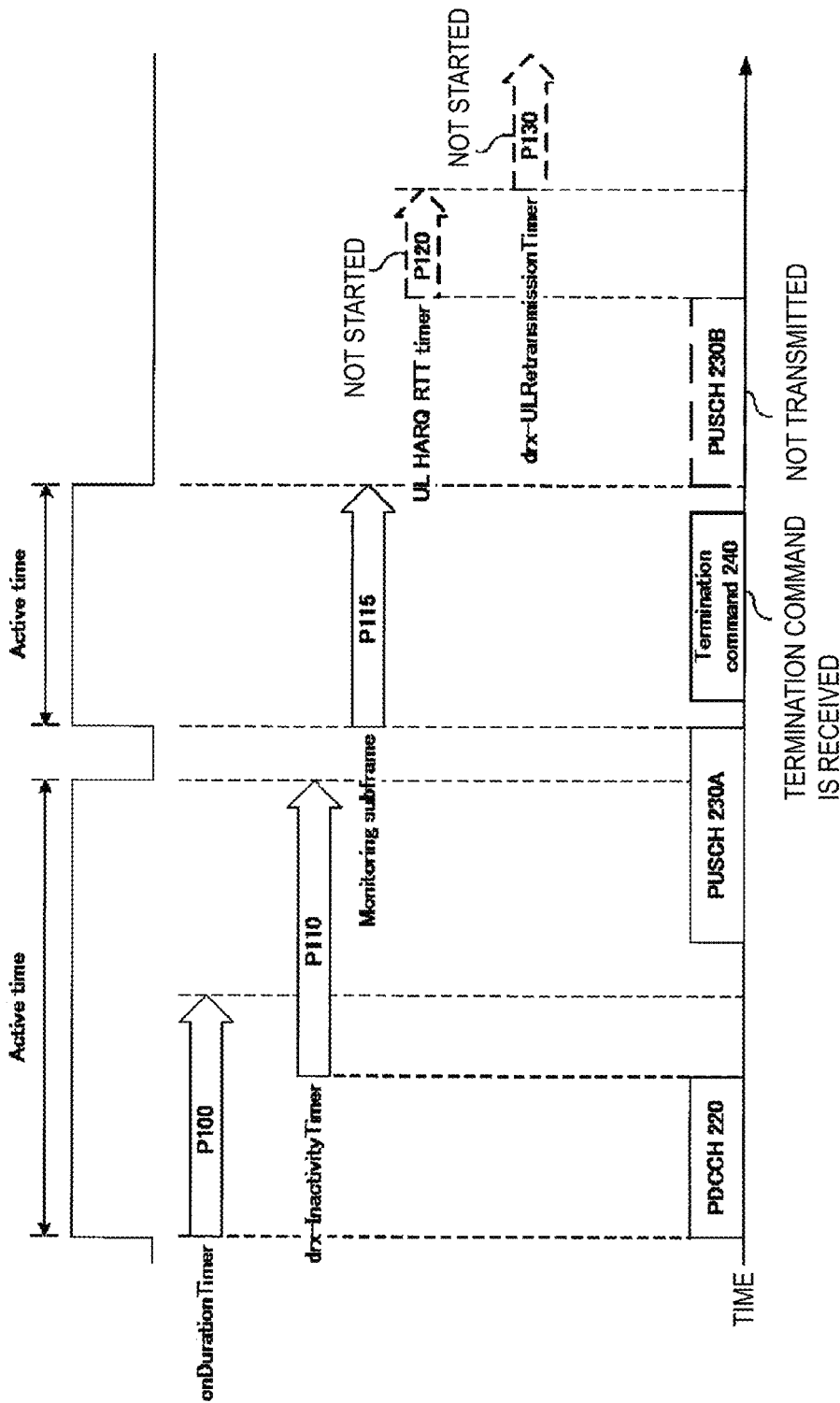
FIG. 12 is a diagram illustrating one example of operations regarding the UL HARQ RTT timer according to the present embodiment.
Figure 13:
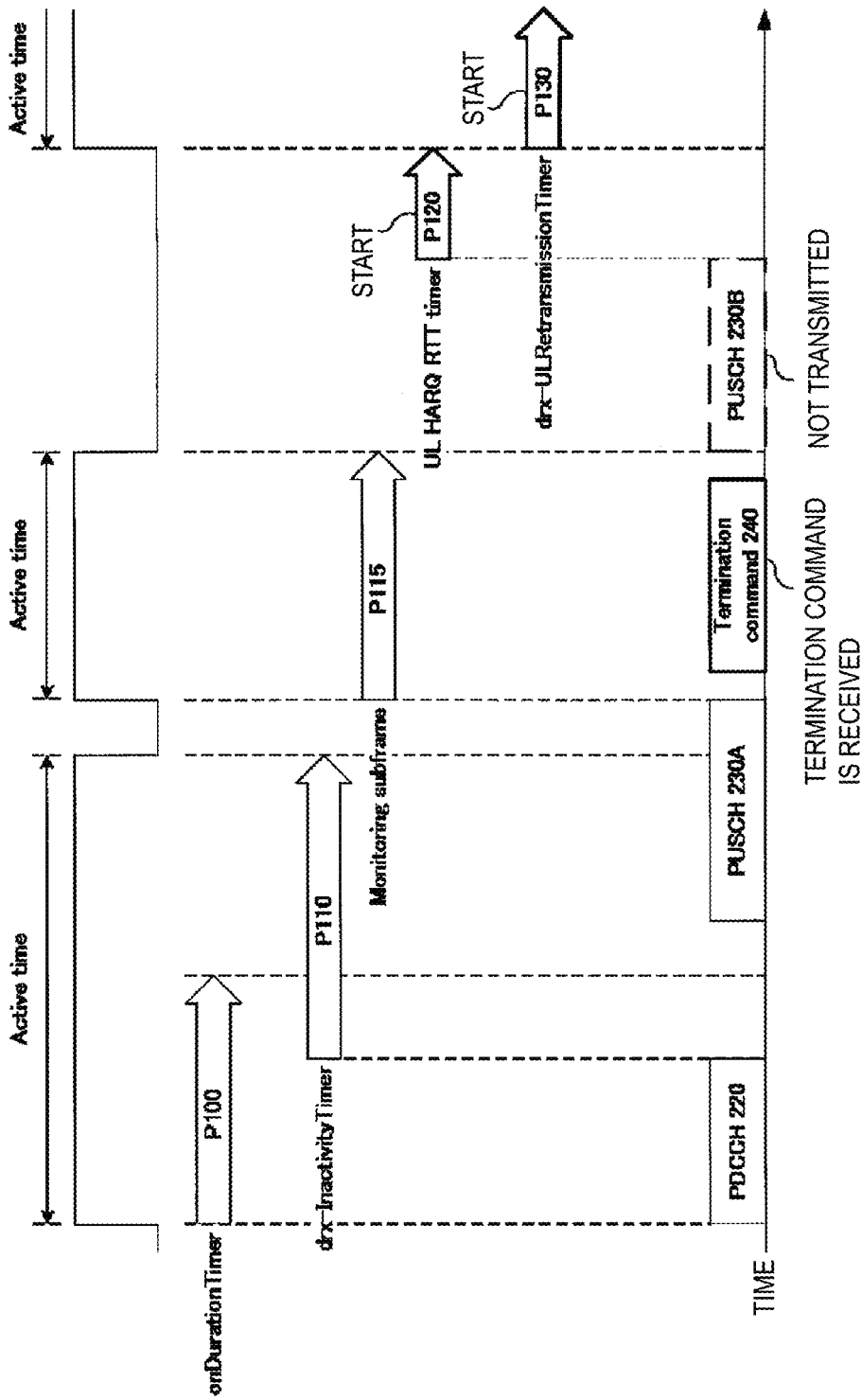
FIG. 13 is a diagram illustrating one example of operations regarding the UL HARQ RTT timer according to the present embodiment.
Figure 14:
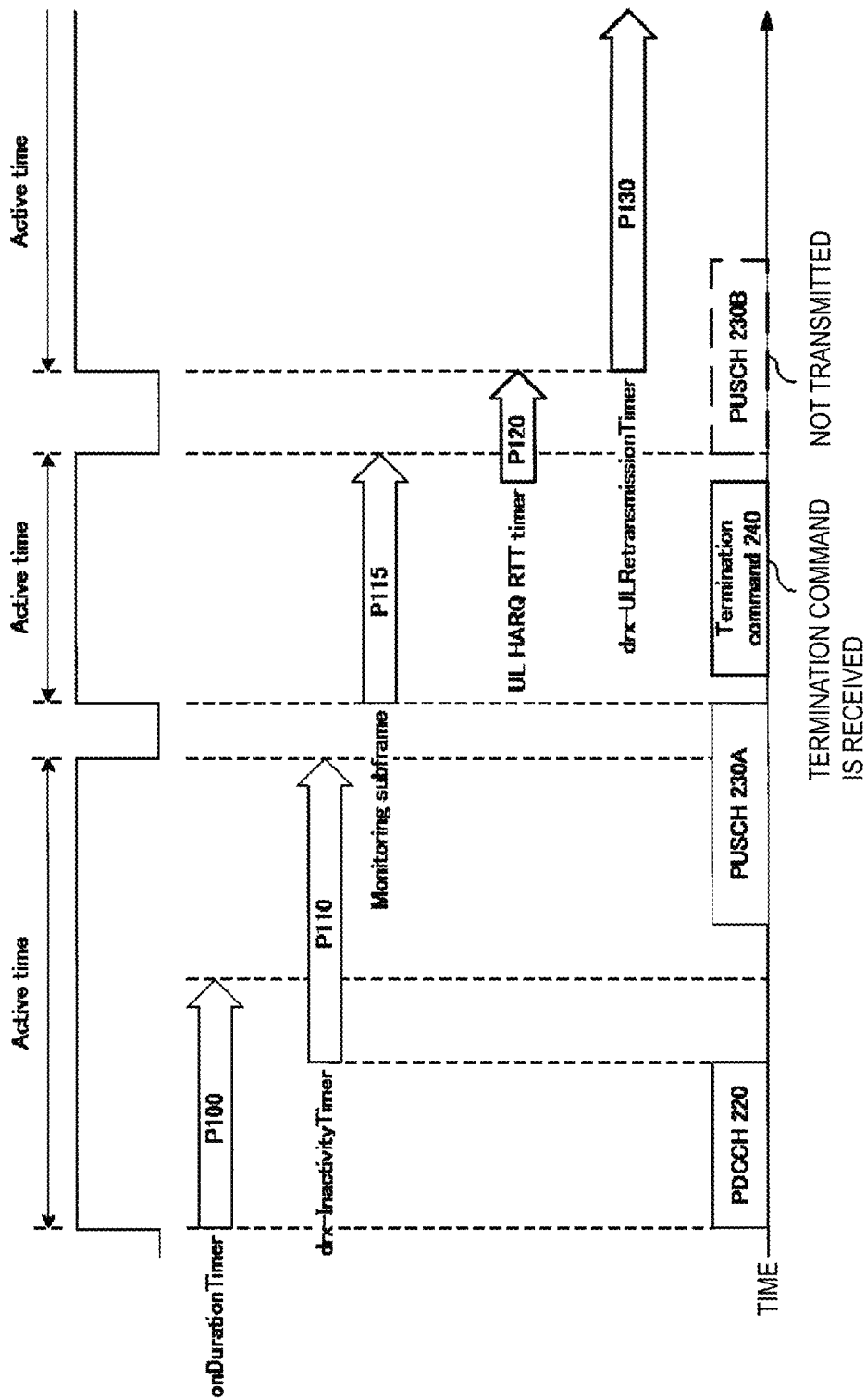
FIG. 14 is a diagram illustrating one example of operations regarding the UL HARQ RTT timer according to the present embodiment.

In FIG. 12 to FIG. 14, the terminal apparatus 1 detects the termination command 240. The terminal apparatus 1 stops (drops) the transmission of a PUSCH 230B based on the detection of the termination command 240.

In FIG. 12, the terminal apparatus 1 does not start the UL HARQ RTT timer based on the detection of the termination command 240. In other words, in a case that the uplink grant received via the PDCCH indicates the uplink transmission, the terminal apparatus 1 may determine whether to start the UL HARQ RTT timer based on whether the termination command has been detected.

In FIG. 13, even in a case that the terminal apparatus 1 detects the termination command 240, the UL HARQ RTT timer is started. Here, the UL HARQ RTT timer is not started in the subframe next to the last subframe including the PUSCH transmission finally repeated. Here, the UL HARQ RTT timer is started in the subframe next to the last subframe of the PUSCH transmission 230 scheduled by the uplink grant. Here, in the last subframe of the PUSCH transmission 230 scheduled by the uplink grant, the PUSCH transmission 230 is not actually transmitted.

In FIG. 14, even in a case that the terminal apparatus 1 detects the termination command 240, the UL HARQ RTT timer is started. Here, the UL HARQ RTT timer is not started in the subframe next to the last subframe including the PUSCH transmission finally repeated. Here, the UL HARQ RTT timer is started in the last subframe including the termination command 240 or the subframe next to the last subframe.

The UL HARQ RTT timer may be started in the subframe next to the last subframe of the actually transmitted PUSCH transmission 230A.

Configurations of apparatuses according to the present embodiment will be described below.

Figure 15:
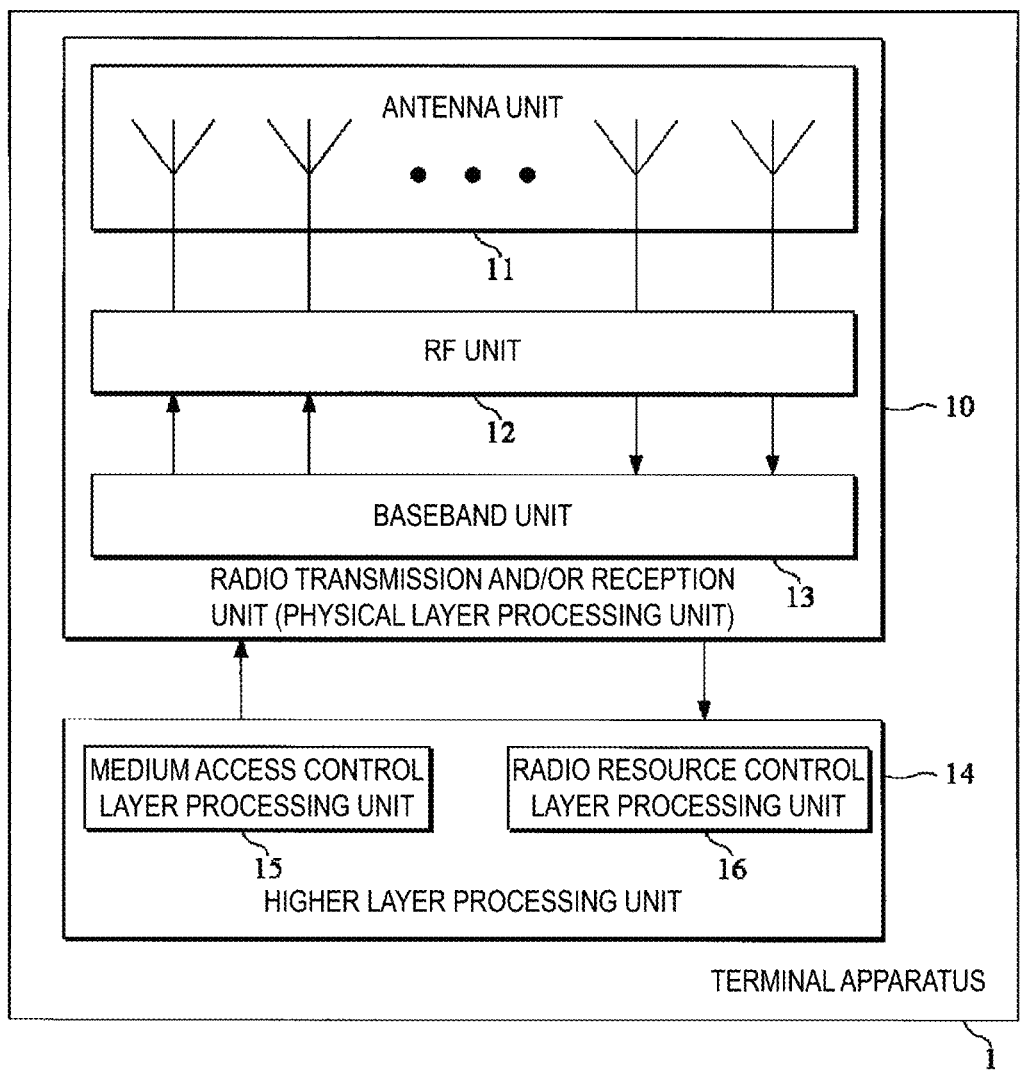
FIG. 15 is a schematic block diagram illustrating a configuration of a terminal apparatus 1 according to the present embodiment.

FIG. 15 is a schematic block diagram illustrating the configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver, a measurement unit, or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, a Packet Data Convergence Protocol (PDCP) layer, a Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls HARQ in accordance with the various pieces of configuration information/parameters managed by the radio resource control layer processing unit 16. The medium access control layer processing unit 15 manages multiple HARQ entities, multiple HARQ processes, and multiple HARQ buffers.

The medium access control layer processing unit 15 identifies (selects, determines) a PDCCH subframe. The medium access control layer processing unit 15 performs processing of DRX, based on the PDCCH subframe. The medium access control layer processing unit 15 manages a timer relating to DRX, based on the PDCCH subframe. The medium access control layer processing unit 15 indicates monitoring of the PDCCH in the subframe to the radio transmission and/or reception unit 10. The monitoring of the PDCCH denotes an attempt to decode the PDCCH in accordance with a DCI format.

The radio resource control layer processing unit 16 included in the higher layer processing unit 14 performs processing of the Radio Resource Control layer. The radio resource control layer processing unit 16 manages various types of configuration information/parameters of the terminal apparatus 1. The radio resource control layer processing unit 16 sets the various pieces of configuration information/parameters in accordance with RRC layer signaling received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 16:
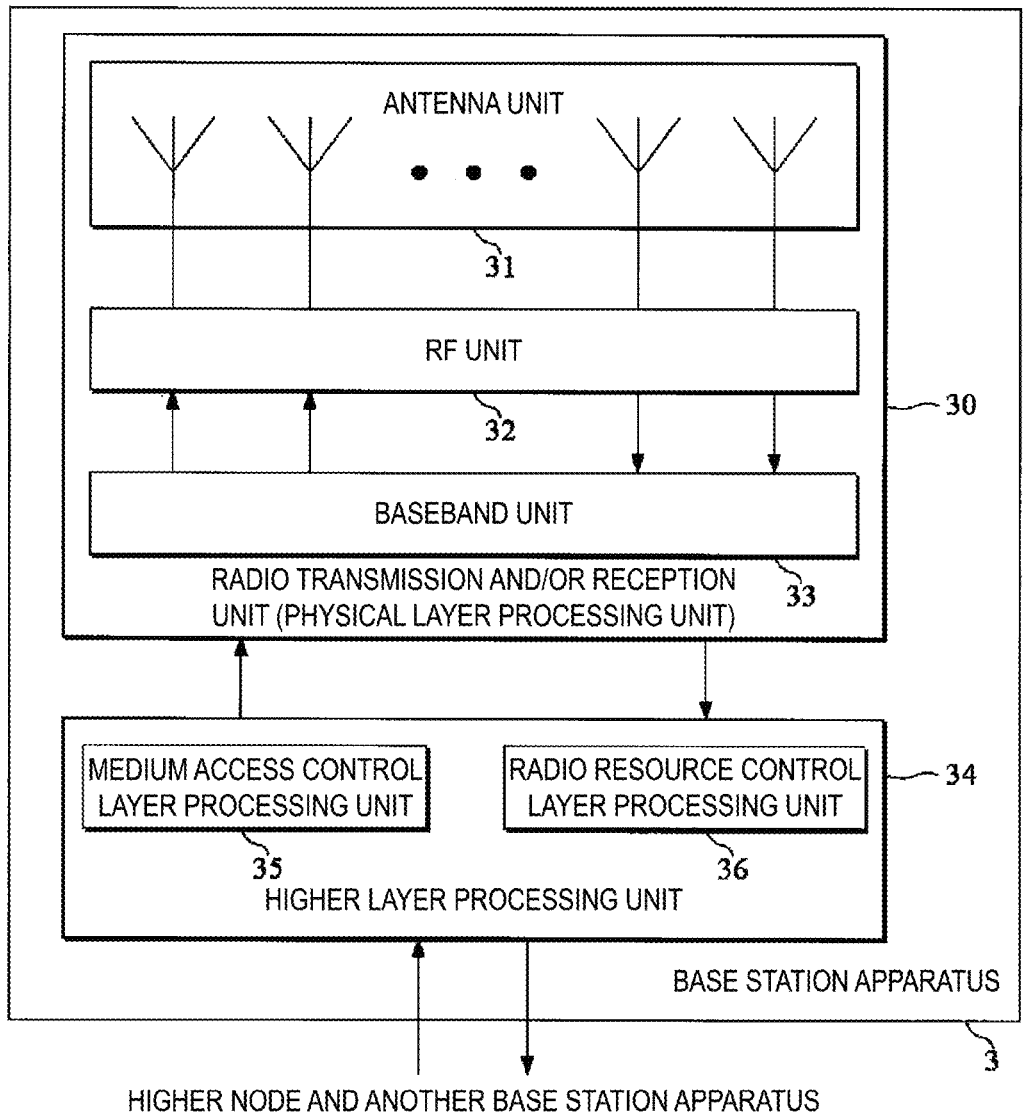
FIG. 16 is a schematic block diagram illustrating a configuration of a base station apparatus 3 according to the present embodiment.

FIG. 16 is a schematic block diagram illustrating the configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of the Medium Access Control (MAC) layer, a Packet Data Convergence Protocol (PDCP) layer, a Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 15 controls HARQ in accordance with the various pieces of configuration information/parameters managed by the radio resource control layer processing unit 16. The medium access control layer processing unit 15 generates an ACK/NACK and HARQ information for uplink data (UL-SCH). The ACK/NACK and HARQ information for the uplink data (UL-SCH) are transmitted to the terminal apparatus 1 on the PHICH or the PDCCH.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information for indicating various types of configuration information/parameters.

The functionality of the radio transmission and/or reception unit 30 is similar to the functionality of the radio transmission and/or reception unit 10, and hence description thereof is omitted.

Each of the units in FIG. 14 and FIG. 15 may be constituted as a circuit. For example, the medium access control layer processing unit may be configured as a medium access control layer processing unit circuit. Each of the units in FIG. 14 and FIG. 15 may be configured as at least one processor and a memory coupled to the at least one processor.

Hereinafter, various aspects of the terminal apparatus and the base station apparatus according to the present embodiment will be described.

(1) In a first aspect of the present embodiment, the terminal apparatus 1 includes a receiver configured to attempt to decode a PDCCH during an active time in a case that an intermittent reception is configured, and a medium access control layer processing unit configured to determine whether to start a UL HARQ RTT timer for a HARQ process based on whether the termination of the uplink transmission is indicated in a case that the PDCCH indicates the uplink transmission for the HARQ process.

(2) In the first aspect of the present embodiment, the UL HARQ RTT timer may be started in a subframe including the uplink transmission finally repeated.

(3) In a second aspect of the present embodiment, the terminal apparatus 1 includes at least one processor and a memory coupled to the at least one processor. The at least one processor is designed to: (i) attempt to decode a PDCCH during an active time in a case that an intermittent reception is configured; (ii) perform an uplink transmission in multiple subframes including a first subframe including the uplink transmission finally repeated in a case that the PDCCH indicates the uplink transmission for a HARQ process and a termination of the uplink transmission is not indicated; and (ii) terminate the uplink transmission in a second subframe prior to the first subframe and start a UL HARQ RTT timer for the HARQ process in the first subframe in a case that the PDCCH indicates the uplink transmission for the HARQ process and the termination of the uplink transmission is indicated.

With this configuration, the terminal apparatus 1 is capable of efficiently communicating with the base station apparatus 3.

A program running on the base station apparatus 3 and the terminal apparatus 1 according to an aspect of the present invention may be a program that controls a Central Processing Unit (CPU) and the like, such that the program causes a computer to operate in such a manner as to realize the functions of the above-described embodiment according to an aspect of the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
reception circuitry configured to and/or programmed to receive a PDCCH (Physical Downlink Control Channel) with an uplink grant which is used for scheduling of an initial transmission of a PUSCH (Physical Uplink Shared Channel);
transmission circuitry configured to and/or programmed to:
perform transmission of the PUSCH; and
drop remaining of the transmission of the PUSCH, if a termination command is detected; and
medium access control layer processing circuitry configured to and/or programmed to start an UL HARQ RTT (Uplink Hybrid Automatic Repeat Request Round Trip Time) timer for a HARQ process based on a condition that the PDCCH indicates an uplink transmission and the termination command has not been received.

2. The terminal apparatus according to claim 1, wherein the termination command is received on a second PDCCH.

3. The terminal apparatus according to claim 1, wherein the termination command includes an ACK (Acknowledgement), a HARQ-ACK, HARQ feedback, or a HARQ response.

4. The terminal apparatus according to claim 1, wherein The PDCCH is an MPDCCH (Machine type communication PDCCH).

5. A communication method of a terminal apparatus, the communication method comprising:
- receiving a PDCCH (Physical Downlink Control Channel) with an uplink grant which is used for scheduling of an initial transmission of a PUSCH (Physical Uplink Shared Channel);
- performing transmission of the PUSCH;
- dropping remaining of the transmission of the PUSCH if a termination command is detected; and
- starting an UL HARQ RTT (Uplink Hybrid Automatic Repeat Request Round Trip Time) timer for a HARQ process based on a condition that the PDCCH indicates an uplink transmission and the termination command has not been received.

\* \* \* \* \*